United States Patent [19]

Shachat

[11] Patent Number: 5,061,523
[45] Date of Patent: Oct. 29, 1991

[54] AUTODEPOSITION PROCESS WITH LOW VOLATILE ORGANIC CHEMICAL EMISSIONS

[75] Inventor: Norman Shachat, Horsham, Pa.

[73] Assignee: Henkel Corporation, Ambler, Pa.

[21] Appl. No.: 587,281

[22] Filed: Sep. 24, 1990

[51] Int. Cl.$^5$ .............................................. B05D 3/02
[52] U.S. Cl. .................................. 427/377; 427/435; 526/319
[58] Field of Search ................. 427/435, 377; 526/319

[56] References Cited

U.S. PATENT DOCUMENTS

| | | | |
|---|---|---|---|
| 3,592,699 | 7/1971 | Stainbrecher et al. | 148/6.2 |
| 4,030,945 | 6/1977 | Hall et al. | 148/6.2 |
| 4,191,676 | 3/1980 | Hall | 260/29.7 |
| 4,313,861 | 2/1982 | Bassett et al. | 260/29.6 |
| 4,411,937 | 10/1983 | Nishida et al. | 427/435 |
| 4,874,673 | 10/1989 | Donovan et al. | 428/463 |

*Primary Examiner*—Michael Lusigman
*Attorney, Agent, or Firm*—Ernest G. Szoke; Wayne C. Jaeschke; Norvell E. Wisdom, Jr.

[57] ABSTRACT

An effective autodeposition bath with low volatile organic compound emissions can be compounded with polymer solids made by polymerizing a mixture of monomers consisting of certain acrylates and other monomers. E.g., a suitable mixture is, in percents by weight, 44% butyl acrylate, 36% acrylonitrile, 10% styrene, 7% methacrylic acid, 2% of the methyl ether of methacrylamide, and 1.5% of hydroxyethyl acrylate.

12 Claims, No Drawings

AUTODEPOSITION PROCESS WITH LOW VOLATILE ORGANIC CHEMICAL EMISSIONS

FIELD OF THE INVENTION

This invention relates to the use of liquid, usually aqueous, solutions or dispersions in which active metal surfaces of inserted objects are coated with an adherent polymer film that increases in thickness the longer the metal object remains in the bath, even though the liquid is stable for a long time against spontaneous precipitation or flocculation of any solid polymer, in the absence of contact with active metal. Such compositions are commonly denoted in the art, and in this specification, as "autodeposition" compositions, dispersions, emulsions, suspensions, baths, solutions, or a like term. Autodeposition is often contrasted with electrodeposition, which can produce very similar adherent films but requires that metal or other objects to be coated be connected to a source of direct current electricity for coating to occur.

DESCRIPTION OF RELATED ART

U.S. Pat. No. 3,592,699 of July 13, 1971, to Steinbrecher et al. is one of the early basic patents on autodeposition. It teaches autodeposition baths generally containing an appropriate polymer latex, an appropriate amount of a soluble oxidizing agent such as hydrogen peroxide or dichromate ion, fluoride ions, and sufficient acid to keep the pH within the range of about 2.5-3.5. The entire specification of this patent, to the extent not inconsistent with any explicit statement in this specification, is hereby incorporated herein by reference.

U.S. Pat. No. 4,030,945 of June 21, 1977, to Hall et al. teaches that the corrosion resistance of ferriferous surfaces coated by autodeposition can be substantially improved by treatment of the uncured autodeposited film with a variety of chromium containing materials. The entire specification of this patent, to the extent not inconsistent with any explicit statement herein, is hereby incorporated herein by reference.

U.S. Pat. No. 4,191,676 of Mar. 4, 1980, to Hall teaches that it is advantageous in autodeposition compositions and processes to keep the amount of surfactant in the aqueous phase of the composition below the critical micelle concentration. As a preferred method of achieving this goal, this patent teaches a method of polymerization called "seed polymerization", which avoids the formation of any substantial amount of a separate phase of monomer(s) during the polymerization process. The portion of the specification of U.S. Pat. No. 4,191,676 between column 4 line 53 and column 6 line 9, inclusive, is hereby incorporated herein by reference.

U.S. Pat. No. 4,313,861 of Feb. 2, 1982, to Basset et al. teaches the use of acrylic latexes in autodeposition compositions and processes. The latexes used are emulsion copolymers of acrylic acid or a substituted acrylic acid and another polymerizable monoethylenically unsaturated monomer, which may be styrene and/or acrylonitrile; the copolymers may also include up to 20% by weight of other comonomers containing a functional hydroxyl group, which may be hydroxyethyl acrylate, and the copolymers may also include up to 1.5% by weight of a polyunsaturated cross linker such as ethylene glycol di(meth)acrylate, and up to 0.3 weight % of a chain transfer agent such as a mercaptan.

U.S. Pat. No. 4,874,673 of Oct. 17, 1989, to Donovan et al. teaches that cracking of autodeposited films composed primarily of resin with a glass transition temperature of not less than 55° C. may be avoided by including in the autodeposition composition a fugitive plasticizer (alternatively called a coalescent), with the most preferred such plasticizer being 2,2,4-trimethylpentane diol-1,3 monoisobutyrate. The preferred resin for an autodeposition composition according to this invention is one prepared by copolymerizing methacrylic acid, ethyl hexyl acrylate, acrylonitrile, and styrene. The amount of fugitive plasticizer is normally from 8 to 30 percent by weight % of the latex resin solids used, with an amount from 10 to 25 weight % of the amount of latex resin solids more preferred. Commercial embodiments of the invention disclosed in this patent generally contain fugitive plasticizer to the extent of at least 15 weight % of the resin solids present.

The complete specification of the above summarized U.S. Pat. No. 4,874,673, to the extent not inconsistent with any explicit statement herein, is also incorporated herein by reference.

The coatings produced by commercial embodiments of the invention described in U.S. Pat. No. 4,874,673 are of high quality, but the high content of fugitive plasticizer in such embodiments produces emissions of volatile organic compounds ("VOC") that are sometimes too high to be allowed in smog-prone urban areas under current environmental laws. It is an object of the present invention to provide autodeposition compositions and processes that produce coatings of at least as high quality as those now produced by commercialized autodeposition compositions and processes, but with substantially lower VOC emissions.

DESCRIPTION OF THE INVENTION

Except in the operating examples, or where otherwise explicitly indicated, in the broadest scope of the invention described here, all numerical quantities in this description indicating amounts of material or reaction conditions are to be understood as modified by the word "about". Operation within the exact numerical ranges specified is generally preferred.

It has now been found that autodeposition compositions based on acrylic type polymer resins within a relatively narrow composition range specified further below allow the achievement of high quality coatings with little or even no coalescent needed.

Specifically, the dispersed solids in an autodeposition bath according to the present invention consist essentially of a copolymer of the following mixture of monomers:

(A) from 40-50 percent by weight ("w/o"), preferably from 43-45 w/o, of monomers selected from the group having the general formula I:

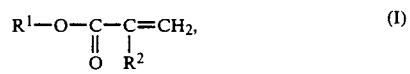

where $R^1$ is a saturated, branched or unbranched, alkyl group having from 3 to 8 carbon atoms and is preferably n-butyl and $R^2$ is hydrogen or methyl;

(B) from 30-40 w/o, preferably from 35-37 w/o, of acrylonitrile;

(C) from 0-20 w/o, preferably from 5-20 w/o, more preferably from 8-12 w/o, of monomers selected from the group consisting of styrene, α-methyl styrene, and methyl methacrylate, with styrene preferred;

(D) from 5–10 w/o, preferably from 6–8 w/o, of monomers selected from the group consisting of acrylic acid and methacrylic acid, with the latter preferred;

(E) from 0–5 w/o, preferably from 1–5 w/o, more preferably from 1.5–2.5 w/o, of the methyl ether of methyl acrylamidoglycolate, having chemical formula II

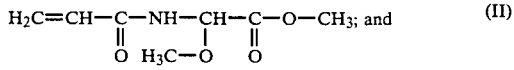

(F) from 0–5 w/o, preferably from 1–5 w/o, more preferably from 1–2 w/o, of monomers selected from the group having the general chemical formula III

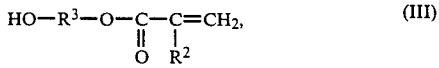

where $R^2$ has the same meaning as in part (A) and $R^3$ is a saturated, branched or unbranched, divalent hydrocarbon moiety having from 2 to 4, preferably 2, carbon atoms and having the two open valences on distinct carbon atoms.

In order to possess reasonable stability to aging, the latex to be used in the invention and containing dispersed solids of the copolymer composed of the residues after polymerization of monomers as specified above preferably also contains an emulsifying agent in an amount of from 0.3 to 1.0 w/o, preferably from 0.5–0.7 w/o, of the total weight in the latex of the monomers as set forth above. Any suitable emulsifying agent known in the art may be used, with anionic emulsifiers preferred. For example, suitable commercially available emulsifiers include Dowfax TM 2A-1 (sodium salt of alkylated diphenyl oxide disulfonate), Abex TM 26-5 Texapon TM E-12 and K-12, Alipal TM CO-433 (sodium salt of sulfated alkyl phenol ethoxylate with an average of 4 ethylene oxide molecules per phenyl ring), CO-436 (ammonium salt, otherwise the same as CO-433), EP-110, and EP-120, Disponsil TM AES-13, and Aerosol TM OT (sodium dioctylsulfosuccinate). The most preferred emulsifier is Dowfax TM 2A-1. Preferably, the latex is made by "seed polymerization" as described in U.S. Pat. No. 4,191,676 already noted above.

The polymer in the latex used in an autodeposition bath according to this invention preferably has a glass transition temperature ("$T_g$") in the range from 55°–70° C., preferably in the range from 58°–66° C. The average particle size of the polymer particles in the latex preferably is within the range from 0.07 to 0.14 microns ("$\mu$"), more preferably from 0.09 to 0.11$\mu$, still more preferably from 0.096 to 0.104$\mu$. The standard deviation of the particle size from the average or mean value is preferably not greater than 0.03$\mu$, and more preferably is not greater than 0.02$\mu$. The glass transition temperature of the polymer and the mean particle size and standard deviation therefrom may be measured by methods well known in the art.

The process of polymerization, including the initiation of polymerization, of the monomers already described above to produce a latex for use according to the invention may be accomplished by any appropriate method known in the art. Thus, for example, in a polymerization to be carried out at 80° C., ammonium persulfate in an amount of from 0.3 to 0.7 w/o of the total monomer weight may be successfully used to initiate polymerization. It has been found preferable, however, to utilize an initiator that combines a free radical generator such as persulfate with reducing agents such as sodium bisulfite and ferrous iron ions. The most preferred initiator contains ammonium persulfate, sodium bisulfite, and ferrous iron ions. When the latter component is supplied by ferrous sulfate heptahydrate as preferred, the amounts of each component are preferably from 0.2–0.4, more preferably from 0.27–0.33, w/o of ammonium persulfate; from 0.05–0.3, more preferably from 0.08–0.2, still more preferably from 0.13–0.17, w/o of sodium bisulfite; and from 0.0002–0.0015, more preferably from 0.00029–0.0007, still more preferably from 0.00050–0.00058, w/o of ferrous sulfate heptahydrate, with all these percentages by weight being based on the total weight of monomers to be polymerized.

In order to further reduce the VOC emissions from compositions according to this invention, the residual monomers are preferable stripped from the latex after normal polymerization is complete. Without such stripping, levels of both butyl acrylate and acrylonitrile monomers are likely to be more than 2,000 parts per million by weight ("ppm") each. Reduction in these levels may be accomplished by conventional means such as exposure to vacuum, for example by exposure of the latex in a rotary evaporator for 2 hours at a temperature of 45°–47° C. at a pressure of 80–100 millibars. Such treatment was successful in reducing residual acrylonitrile from more than 1,000 ppm to less than 25 ppm and also substantially reduced residual butyl acrylate. About 13 w/o of the total aqueous phase distilled during this stripping process. Alternatively, stripping at 85° C. at atmospheric pressure may be used.

Another and often more convenient method that can give adequate stripping effect is to add more initiator after the polymerization at elevated temperature(s) is completed. For example, 0.1 w/o of ammonium persulfate may be added after the initially formed latex has cooled, and this will reduce the residual acrylonitrile and butyl acrylate by factors of about 2 to 4, i.e., down to less than 1,000 ppm for butyl acrylate and less than 400 ppm for acrylonitrile. This "chaser" method may advantageously be combined with stripping by distillation of volatiles if desired. The most preferred "chaser" consists of 0.1 w/o t-butyl hydroperoxide and 0.1 erythorbic acid, with the percentages being based on the total weight of monomers originally used to make the polymer in the latex treated.

Contrary to the prior art, many polymers as described above can be used within the scope of this invention to prepare satisfactory crack-free coatings, even when the $T_g$ of the polymer is above 55° C., even though no coalescent or plasticizer is used in the autodeposition composition along with the polymer. In some cases, however, the quality of the coating formed by autodeposition may be further increased by addition of a coalescent along with a latex containing copolymer resin solids as described above. In such cases, the same coalescents as are described as "fugitive plasticizers" in U.S. Pat. No. 4,874,673 are preferred for use with this invention, including the highest preference for 2,2,4-trimethylpentane diol-1,3 monoisobutyrate as the coalescent. According to this invention, however, the amount of coalescent used is, with increasing preference, no greater than 8, 5, 4, or 1.5 w/o of the total weight of polymer solids in the autodeposition bath.

Except for the particular copolymer resin solids, coalescent content, and other conditions noted explicitly above, autodeposition compositions and processes according to this invention may be and preferably are essentially the same as in the prior art. Thus, a complete autodeposition bath contains, in addition to the dispersed resin solids and optional coalescent, an acidic component, preferably hydrofluoric acid, in sufficient amount to produce a pH of less than 7, preferably a pH in the range from 1.6 to 3.8. The autodeposition composition also contains an oxidizer component, preferably hydrogen peroxide, preferably in sufficient amount to maintain the oxidizing power of the solution, as measured by the potential of a platinum electrode immersed in the solution, at a potential at least 325 millivolts ("mv") more oxidizing than a silver-saturated silver chloride reference electrode. When a bath is fresh, especially when it contains relatively little dissolved iron, considerably higher oxidizing potentials are generally preferred, sufficient that at least 0.2 grams of iron per square meter of ferriferous surface immersed in the bath will dissolve within the first minute of immersion. After iron accumulates in the bath, or when iron is added deliberately from the beginning of the process as taught in U.S. Pat. No. 4,411,937, the entire specification of which (except for any part that may be inconsistent with any explicit statement herein) is hereby incorporated herein by reference, the oxidizing potential is preferably kept somewhat lower than this, for example in the range from 350 to 375 mv more oxidizing than a standard silver-saturated silver chloride reference electrode.

Precleaning processes before use of an autodeposition bath according to this invention, the time and temperature of autodeposition treatment, and post-treatment(s) after formation of the wet autodeposited coating are all preferably the same in a process according to this invention as are preferred in the prior art, with the possible exception that the "dwell time" between removal of a coated part from the autodeposition bath and its first rinsing in a process according to this invention preferably is passed in an atmosphere with a relative humidity of at least 50%, or more preferably of at least 60%. Consistently with the prior art, the use of a chromium containing rinse of the wet autodeposited coatings as taught in U.S. Pat. No. 4,030,945 is highly preferred as part of, or in connection with, an autodeposition process according to this invention.

The practice of this invention may be further appreciated from the following non-limiting examples and comparison examples.

GENERAL PROCEDURES

Latex Synthesis

I. Thermal Initiator

The total intended final water content of the latex, except for a possible small fraction of the total reserved to dissolve part of the initiator, a specified fraction (5% unless otherwise indicated) of the mixture of monomers to be polymerized to form the latex, and a specified fraction (20% unless otherwise indicated) of the initiator to be used were introduced into a stirred vessel and brought to a temperature of 80° C. with constant stirring. The amount of emulsifier, and the distribution of this amount between the initial charge to the reaction vessel and the materials added later, are specified in the tables below.

After the temperature had reached 80°, the remainder of the monomer mix and initiator, together with any specified amount of emulsifier, were fed into the reaction vessel at a constant rate over 150 minutes ("min"). After completion of these additions, the latex was heated to 85° C. for 60 min, then cooled and filtered through cheesecloth. Some latexes where specifically indicated were "chased" after synthesis with a mixture of t-butyl hydroperoxide and erythorbic acid.

II. Mixed Thermal and Redox Initiation

This was performed in the same manner as for the purely thermal initiation described in part I, except that
(1) the temperature of synthesis was 60° C.,
(2) the initiator comprised three components, and 10% of the persulfate, 10% of the bisulfite, and all of the ferrous sulfate heptahydrate were introduced in the initial charge, along with 5% of the monomer mix, and
(3) monomer mix, bisulfite, and persulfate, the latter two in aqueous solution, were fed separately during the remainder of the syntheses.

Latex and Polymer Analysis (1) $T_g$ was determined on a sample of polymer prepared by drying a sample of the latex at 140° for 30 min, using a Perkin Elmer Model DSC-4 differential scanning calorimeter at a scan rate of 40° C. per min. The value given is for the midpoint of the transition.

(2) Percent solids was determined on an accurately weighed 1-2 gram sample of the latex after drying in a forced air oven at 140° C. for 30 min.

(3) Percent conversion is defined as 100 times the ratio of the weight of dry polymer produced to the weight of monomers introduced.

(4) Latex surface tension ("$\gamma$") was measured by the du Nouy method with a Fisher Tensiomat ™. Values reported are uncorrected.

(5) Polymer particle size average and standard deviation in the latex were measured with a Nicomp ™ Model 370 Submicron Particle Sizer.

(6) Latex viscosity values were measured with a Brookfield rotametric viscosimeter at 60 revolutions per minute with spindle #1.

(7) Percent wet gum is 100 times the ratio of the amount of material recovered by filtration through multiple layers of cheesecloth to the total weight of the batch of latex tested.

Autodeposition Formulation and Process Conditions

The normal formulation of an autodeposition composition was:

| | |
|---|---|
| Latex | 145 parts by weight |
| Aqueous solution containing: | |
| (0.75 $\underline{M}$ HF) | |
| (0.54 $\underline{M}$ FeF$_3$) | 53 parts by weight |
| (0.06 $\underline{M}$ H$_2$O$_2$) | |
| Aquablack ™ 255 dispersion of carbon black pigment | 4 parts by weight |
| Deionized water | 798 parts by weight |
| Coalescent | Variable as indicated |

The autodeposition coating, for a time sufficient to produce a film 17.7±0.8μ thick, was normally followed by 60 seconds ("sec") dwell time after removal from the bath, then 60 sec tap water rinse (at a water temperature of about 20° C.), then 60 sec treatment with a hexavlaent chromium containing rinse as described in U.S. Pat. No. 4,030,945, then 20 min in an oven at 160° C. for final cure. Coatings were applied to conventionally cleaned cold rolled steel panels, and these were performance tested in a conventional manner for wet adhesion and then after final curing for salt spray resistance, edge crack resistance, reverse impact at 0.45 and/or 1.8 kilogram-meters (=40 and 160 inch-pounds, respectively), pencil hardness of the film, and brake fluid resistance.

The following trademarks and acronyms and/or other abbreviations are used in the following tables and discussion: BOTM=based on total monomers; BA=butyl acrylate; AN=acrylonitrile; AM=acrylamide; S=styrene; AMS=α-methyl styrene; AA=acrylic acid; MAA=methacrylic acid; MAGME TM =methylacrylamidoglycolate, methyl ether; HEA=hydroxyethyl acrylate; APS=ammonium persulfate; SMB=sodium (meta)bisulfite; t-BHP=tertiary butyl hydroperoxide; Texanol TM =2,2,4-trimethylpentane diol-1,3 monoisobutyrate.

Table 1 shows that the amount of the preferred crosslinking combination monomers MAGME and HEA can be varied within a factor of three with relatively little effect on the quality of coating obtained when no coalescent is used. All these compositions are acceptable for some conditions. Table 2 shows that the $T_g$ value is quite sensitive to the BA/AN ratio. Latex JG 1257-04, with the highest ratio shown, is less preferred because of its reduced brake fluid resistance. However, all these formulation can provide acceptable autodeposition coatings for some conditions of use.

Tables 3-6 show the effects of varying levels of four different emulsifiers, with the monomer composition constant. Aerosol TM OT (Table 3) and Alipal TM CO-433 (Table 4) showed little if any plasticizing effect from higher levels of emulsifier, while Alipal TM CO-433 (Table 5) showed a modest plasticizing effect and Dowfax TM 2A-1 (Table 6) showed a definite plasticizing effect. At the highest levels shown in the Tables, all these emulsifiers appeared to reduce wet adhesion and salt spray resistance. The results shown in these Tables are without any coalescent; when 8 parts by weight per hundred parts of polymer resin solids ("PHR") of Texanol TM was added to these formulations, all edge cracking was substantially eliminated and all compositions passed the wet adhesion test.

Table 7 illustrates the effect of substituting the preferred HEA with HEMA. Brake fluid resistance and salt spray field results were less favorable than in Table 1.

Table 8 illustrates the effect of substituting AA for the preferred MAA. Coating properties were comparable to those obtained with 5-7% MAA, yielding a $T_g$ of about 62° C. However, wet gum levels were undesirably higher and the wet adhesion test results were not as good as with MAA; the latter property could be overcome by addition of 8 PHR of Texanol TM.

TABLE 1

EFFECT OF TOTAL AMOUNT OF MAGME TM + HEA
Polymer Composition: (43 + x)BA/(45 + y)
AN/7MAA/(3 − x)MAGME/(2 − y)HEA

| Latex No. | NS1245-17 | NS1245-21 | NS1245-25 |
|---|---|---|---|
| Latex Properties[a] | | | |
| MAGME/HEA | 3/2 | 2/1.3 | 1/0.7 |
| x | 0 | 1 | 2 |
| y | 0 | 0.7 | 1.3 |
| % Wet Gum | 0.23 | 0.10 | 0.05 |
| % Solids | 41.9 | 41.9 | 41.9 |
| % Conv. | 97.9 | 97.9 | 97.9 |
| Nicomp Mean d(μ) | 0.136 | 0.129 | 0.124 |
| Brookfield Visc., 60 RPM (cps) | 19.1 | 19.5 | 22.9 |
| γ (dynes/cm) (Uncorr.) | 53.4 | 56.9 | 55.4 |
| Tg by DSC (°C.) | 73.6 | 70.9 | 67.2 |
| AC Test Results[b] | | | |
| Rinse-Off | v. sl. | None | None |
| Wet Adhesion | | | |
| 3' | P | F (spot)[c] | P |
| Scribe | P | P | P |
| Edge Cracking | sl.-mod. | sl.-mod. | mod.-sev. |
| Pencil Hardness | 4H | 4H | 4H |
| Reverse Impact @ 160 in-lbs. | 10/10 | 10/10 | 10/10 |
| Brake Fluid Resistance (Pencil Hardness after soak for) | | | |
| ½ hr. | 4H | 4H | 3H |
| 1 hr. | 3H | 3H | 4H |
| 2 hr. | 3H | 3H | 3H |
| 4 hr. | 3H | 4H | 3H |
| 16 hr. | 2H | F | 3H |
| Salt Spray Resistance (0.7 mil; 504 hr.) | | | |
| Scribe | 7 | 7+ | 7+ |
| Field | 9+ | 9 | 10 |

[a]Emulsifier: 0.30% Dowfax 2A-1 (BOTM); all included in seed charge.
[b]No coalescent employed in the formulation.
[c]Failed similarly on retest.

TABLE 2

EFFECT OF BA/AN RATIO IN MONOMERS
Pol. Comp.: (89.7−x)BA/xAN/7MAA/2MAGME/1.3HEA

| Latex No. | NS1245-21 | NS1245-27 | JG1257-01 | JG1257-04 |
|---|---|---|---|---|
| Latex Properties[a] | | | | |
| % AN, x | 45.7 | 43.7 | 41.7 | 39.7 |
| % Wet Gum | 0.10 | 0.09 | 0.19 | 0.15 |
| % Solids | 41.9 | 41.8 | 41.7 | 41.8 |
| % Conv. | 97.9 | 97.7 | 97.4 | 97.7 |
| Nicomp Mean d(μ) | 0.129 | 0.117 | 0.115 | 0.129 |
| Brookfield Visc., 60 RPM (cps) | 19.5 | 20.8 | 14.1 | 23.0 |
| γ (dynes/cm) (Uncorr.) | 56.9 | 54.1 | 55.1 | 55.6 |
| pH | 4.30 | 4.20 | 3.80 | 4.15 |
| Tg by DSC (°C.) | 70.9 | 69.5 | 67.0 | 63.1 |
| AC Test Results[b] | | | | |
| Rinse-Off | None | None | v.sl. | None |
| Wet Adhesion | | | | |
| 3' | F (spot) | P | P | P |
| Scribe | P | P | P | P |
| Edge Cracking | sl.-mod. | sl.-mod. | sl.-mod. | sl.-mod. |
| Pencil Hardness | 4H | 3H | 4H | 3H |

TABLE 2-continued
EFFECT OF BA/AN RATIO IN MONOMERS
Pol. Comp.: (89.7−x)BA/xAN/7MAA/2MAGME/1.3HEA

| Latex No. | NS1245-21 | NS1245-27 | JG1257-01 | JG1257-04 |
|---|---|---|---|---|
| Reverse Impact @ 160 in-lbs. | 10/10 | 10/10 | 10/10 | 10/10 |
| Brake Fluid Resistance (Pencil Hardness after soak for) | | | | |
| ½ hr. | 4H | 3H | 4H | 3H |
| 1 hr. | 3H | 3H | 3H | 3H |
| 2 hr. | 3H | 3H | 3H | 2H |
| 4 hr. | 4H | 3H | 3H | HB |
| 16 hr. | F | 3B | 3B | 3B++ |
| Salt Spray Resistance (0.7 mil; 504 hr.) | | | | |
| Scribe | 7+ | 7+ | 7 | 7 |
| Field | 9 | 9+ | 9+ | 9 |

[a]Emulsifier: 0.30% Dowfax 2A-1 (BOTM); all included in seed charge.
[b]No coalescent employed in formulation.

TABLE 3
EFFECT OF AEROSOL ™ OT EMULSIFIER LEVEL
Polymer Composition
48BA/41.7AN/7MAA/2MAGME/1.3HEA

| Latex No. | JG1257-31 | JG1257-16 | JG1257-13 |
|---|---|---|---|
| Latex Properties[a] | | | |
| % Aerosol OT | 0.15 | 0.30 | 0.60 |
| % Wet Gum | 0.15 | 0.05 | 0.05 |
| % Solids | 41.9 | 41.9 | 42.0 |
| % Conv. | 98.1 | 97.9 | 97.9 |
| Nicomp Mean d(μ) | 0.133 | 0.089 | 0.089 |
| Brookfield Visc., 60 RPM (cps) | 21.5 | 44.2 | 76.0 |
| γ (dynes/cm) (Uncorr.) | 45.1 | 42.3 | 38.9 |
| pH | 4.45 | 4.50 | 4.40 |
| Tg by DSC (°C.) | 68.9 | 66.4 | 66.4 |
| AC Test Results[b] | | | |
| Rinse-Off | None | None | None |
| Wet Adhesion | | | |
| 3' | P | F (spot)[c] | F (spot)[c] |
| Scribe | P | P | P |
| Edge Cracking | tr.-mod. | tr.-sl. | tr.-sl. |
| Pencil Hardness | 3H | 3H | 3H |
| Reverse Impact @ 160 in-lbs. | 10/10 | 10/10 | 10/10 |
| Brake Fluid Resistance (Pencil Hardness after soak for) | | | |
| ½ hr. | 3H | 3H | 3H |
| 1 hr. | 3H | 3H | 3H |
| 2 hr. | 2H | 3H | 3H |
| 4 hr. | 3H | 3H | 3H |
| 16 hr. | 3B | B | B |
| Salt Spray Resistance (0.7 mil; 504 hr.) | | | |
| Scribe | 7+ | 9 | 8− |
| Field | 8+ | 10 | 9+ |

[a]All emulsifier (Aerosol OT) included in seed charge.
[b]No coalescent employed in the formulation.
[c]Failed on retest.

TABLE 4
EFFECT OF ALIPAL ™ CO-433 EMULSIFIER LEVEL
Polymer Composition
48BA/41.7AN/7MAA/2MAGME/1.3HEA

| Latex No. | JG1257-19 | JG1257-22 | JG1264.15 |
|---|---|---|---|
| Latex Properties | | | |
| % Alipal CO-433 | 0.30[a] | 0.60[a] | 1.0[b] |
| % Wet Gum | 0.10 | 0.06 | 0.10 |
| % Solids | 42.0 | 42.1 | 42.2 |
| % Conv. | 98.1 | 98.1 | 97.9 |
| Nicomp Mean d(μ) | 0.092 | 0.073 | 0.077 |
| Brookfield Visc., 60 RPM (cps) | 41.8 | 44.6 | 55.7 |
| γ (dynes/cm) (Uncorr.) | 55.2 | 51.3 | 49.5 |
| pH | 4.25 | 4.25 | 4.25 |
| Tg by DSC (°C.) | 60.1 | 65.8 | 63.6 |
| AC Test Results[c] | | | |
| Rinse-Off | None | None | None |
| Wet Adhesion | | | |
| 3' | P[d] | P | P |
| Scribe | P | P | P |
| Edge Cracking | tr.-sl. | v.sl.-sl. | sl.-sev. |
| Pencil Hardness | 3H | 3H | 3H |
| Reverse Impact @ 160 in-lbs. | 10/10 | 10/10 | 10/10 |
| Brake Fluid Resistance (Pencil Hardness after soak for) | | | |
| ½ hr. | 3H | 3H | 3H |
| 1 hr. | 3H | 3H | 2H |
| 2 hr. | 2H | 3H | 3H |
| 4 hr. | H | 3H | 2B |
| 16 hr. | B | B | 3B |
| Salt Spray Resistance (0.7 mil; 504 hr.) | | | |
| Scribe | 7+ | 7 | 3 |
| Field | 9 | 9+ | 8 |

[a]All emulsifier included in seed charge.
[b]Half emulsifier in seed charge; other half added during feed.
[c]No coalescent employed in formulation.
[d]Initially showed spot failure. Passed on retest.

TABLE 5
EFFECT OF ALIPAL ™ CO-436 EMULSIFIER LEVEL
Polymer Composition
48BA/41.7AN/7MAA/2MAGME/1.3HEA

| Latex No. | JG1257-25 | JG1257-28 | JG1264-12 |
|---|---|---|---|
| Latex Properties | | | |
| % Alipal CO-436 | 0.30[a] | 0.60[a] | 1.0[b] |
| % Wet Gum | 0.22 | 0.06 | 0.14 |
| % Solids | 41.8 | 42.1 | 42.3 |
| % Conv. | 97.7 | 98.1 | 98.1 |
| Nicomp Mean d(μ) | 0.098 | 0.089 | 0.072 |
| Brookfield Visc., 60 RPM (cps) | 38.0 | 53.9 | 77.4 |
| γ (dynes/cm) (Uncorr.) | 53.9 | 52.3 | 51.0 |
| pH | 4.25 | 4.20 | 4.25 |
| Tg by DSC (°C.) | 67.7 | 63.4 | 63.3 |
| AC Test Results[c] | | | |
| Rinse-Off | None | None | None |
| Wet Adhesion | | | |
| 3' | F (spot)[d] | P | P |
| Scribe | P | P | P |

TABLE 5-continued
EFFECT OF ALIPAL ™ CO-436 EMULSIFIER LEVEL
Polymer Composition
48BA/41.7AN/7MAA/2MAGME/1.3HEA

| Latex No. | JG1257-25 | JG1257-28 | JG1264-12 |
|---|---|---|---|
| Edge Cracking | tr.-v.sl. | tr.-sl. | sl.-mod. |
| Pencil Hardness | 3H | 3H | 2H |
| Reverse Impact @ 160 in-lbs. | 10/10 | 10/10 | 10/10 |
| Brake Fluid Resistance (Pencil Hardness after soak for) | | | |
| ½ hr. | 2H | 3H | 2H |
| 1 hr. | 3H | 3H | 2H |
| 2 hr. | 3H | 3H | B |
| 4 hr. | 2H | 2H | 2B |
| 16 hr. | 2B | 2B | 3B |
| Salt Spray Resistance (0.7 mil; 504 hr.) | | | |
| Scribe | 7+ | 7+ | 2 |
| Field | 10 | 10 | 9 |

[a]All emulsifier included in seed charge.
[b]Half emulsifier in seed charge; other half added during feed.
[c]No coalescent employed in formulation.
[d]Failed similarly on retest.

TABLE 6
EFFECT OF DOWFAX ™ 2A-1 EMULSIFIER LEVEL
Polymer Composition
48BA/41.7AN/7MAA/2MAGME/1.3HEA

| Latex No. | JG1264-03 | JG1264-06 | JG1264-09 |
|---|---|---|---|
| Latex Properties | | | |
| % Dowfax 2A-1 | 0.30[a] | 0.60[a] | 1.0[b] |
| % Wet Gum | 0.09 | 0.06 | 0.04 |
| % Solids | 41.8 | 42.2 | 42.0 |
| % Conv. | 97.7 | 98.4 | 97.5 |
| Nicomp Mean d(μ) | 0.112 | 0.087 | 0.096 |
| Brookfield Visc., 60 RPM (cps) | 26.0 | 35.8 | 29.3 |
| γ (dynes/cm) (Uncorr.) | 55.2 | 54.9 | 49.5 |
| pH | 4.95 | 4.20 | 4.35 |
| Tg by DSC (°C.) | 68.9 | 65.3 | 63.6 |
| AC Test Results[c] | | | |
| Rinse-Off | None | None | None |
| Wet Adhesion | | | |
| 3' | P | P | P |
| Scribe | P | P | P |
| Edge Cracking | v.sl.-mod. | v.sl.-mod. | sl.-mod. |
| Pencil Hardness | 3H | 3H | 3H |
| Reverse Impact @ 160 in-lbs. | 10/10 | 10/10 | 10/10 |
| Brake Fluid Resistance (Pencil Hardness after soak for) | | | |
| ½ hr. | 2H | 3H | 3H |
| 1 hr. | H | 3H | 2H |
| 2 hr. | HB | H | HB |
| 4 hr. | 3B | H | 2B |
| 16 hr. | 3B | 2B | 3B |
| Salt Spray Resistance (0.7 mil; 504 hr.) | | | |
| Scribe | 6 | 7 | 5 |
| Field | 7 | 7 | 7+ |

[a]All emulsifier included in seed charge.
[b]Half emulsifier in seed charge; other half added during feed.
[c]No coalescent employed in formulation.

TABLE 7
EFFECT OF SUBSTITUTING HEMA FOR HEA IN MONOMER MIX
Pol. Comp.: 48BA/(45-x-y)AN/7MAA/xMAGME/yHEMA

| Latex No. | JG1257-86 | JG1257-80 | JG1257-83 |
|---|---|---|---|
| Latex Properties[a] | | | |
| % MAGME, x | 3 | 2 | 1 |
| % HEMA, y | 2.25 | 1.5 | 0.75 |
| % Wet Gum | 0.14 | 0.06 | 0.05 |

TABLE 7-continued
EFFECT OF SUBSTITUTING HEMA FOR HEA IN MONOMER MIX
Pol. Comp.: 48BA/(45-x-y)AN/7MAA/xMAGME/yHEMA

| Latex No. | JG1257-86 | JG1257-80 | JG1257-83 |
|---|---|---|---|
| % Solids | 41.9 | 41.5 | 41.5 |
| % Conv. | 97.9 | 97.0 | 97.0 |
| Nicomp Mean d(μ) | 0.108 | 0.104 | 0.112 |
| Brookfield Visc., 60 RPM (cps) | 24.9 | 22.4 | 25.1 |
| γ (dynes/cm) (Uncorr.) | 56.6 | 56.0 | 56.9 |
| pH | 3.90 | 4.55 | 4.70 |
| Tg by DSC (°C.) | 69.4 | 66.1 | 71.0 |
| AC Test Results[b] | | | |
| Rinse-Off | None | None | None |
| Wet Adhesion | | | |
| 3' | P | P | P |
| Scribe | P | P | P |
| Edge Cracking | v.sl.-mod. | sl.-mod. | v.sl.-mod. |
| Pencil Hardness | 2H | 2H | 3H |
| Reverse Impact @ 160 in-lbs. | 10/10 | 10/10 | 10/10 |
| Brake Fluid Resistance (Pencil Hardness after soak for) | | | |
| ½ hr. | 2H | H | 2H |
| 1 hr. | H | HB | 2H |
| 2 hr. | B | HB | 2H |
| 4 hr. | 3B | 3B | 3B |
| 16 hr. | 3B | 3B | 3B |
| Salt Spray Resistance (0.7 mil; 504 hr.) | | | |
| Scribe | 7 | 7+ | 7+ |
| Field | 7 | 8+ | 7+ |

[a]Emulsifier: 0.3% Dowfax 2A.1 (BOTM); all included in seed charge.
[b]No coalescent employed in formulation.

TABLE 8
EFFECT OF REPLACING MAA WITH AA AT CONSTANT $T_g$
Pol. Comp.: (51-½x)BA/(45.7-½x)AN/xAA/2MAGME/1.3HEA

| Latex No. | JG1257-34 | JG1257-37 | JG1257-40 |
|---|---|---|---|
| Latex Properties[a] | | | |
| % AA, x | 2 | 4 | 6 |
| % Wet Gum | 0.26 | 0.33 | 0.70 |
| % Solids | 41.9 | 41.8 | 41.8 |
| % Conv. | 97.9 | 97.7 | 97.7 |
| Nicomp Mean d(μ) | 0.131 | 0.111 | 0.112 |
| Brookfield Visc., 60 RPM (cps) | 15.8 | 17.2 | 17.6 |
| γ (dynes/cm) (Uncorr.) | 55.5 | 55.2 | 53.2 |
| pH | 4.25 | 3.90 | 3.75 |
| Tg by DSC (°C.) | 62.0 | 61.8 | 63.4 |
| AC Test Results[b] | | | |
| Rinse-Off | None | v.sl. | None |
| Wet Adhesion | | | |
| 3' | F (spot) | F (spot) | F (spot) |
| Scribe | P | P | P |
| Edge Cracking | sl.-mod. | v.sl.-mod. | sl.-sev. |
| Pencil Hardness | 2H | 2H | 2H |
| Reverse Impact @ 160 in-lbs. | 10/10 | 10/10 | 10/10 |
| Brake Fluid Resistance (Pencil Hardness after soak for) | | | |
| ½ hr. | 2H | 2H | 2H |
| 1 hr. | 2H | 2H | 2H |
| 2 hr. | 2H | 2H | 2H |
| 4 hr. | H | 2H | 2H |
| 16 hr. | B | B | B |
| Salt Spray Resistance (0.7 mil; 504 hr.) | | | |
| Scribe | 7+ | 7+ | 7− |
| Field | 9 | 10 | 9 |

[a]Emulsifier: 0.3% Dowfax 2A-1 (BOTM); all included in seed charge.
[b]No coalescent employed in formulation.

Some results with redox initiated polymerization are shown in Tables 9 and 10. All except NS1245-29 had relatively less brake fluid resistance than most thermally initiated polymers as shown in the preceding tables. The edge cracking shown in the Tables could be eliminated by adding 8 PHR of Texanol TM.

Table 11 shows some properties of latexes made with thermally initiated polymerization, incorporating some additional emulsifier types not included in Tables 3-6. All these latexes produced autodeposited coatings adequate for use under many conditions, even without any coalescent, as shown in Table 12. The excellent reverse impact test results are particularly notable. The edge cracking shown in Table 12 can be essentially eliminated by addition of 8 PHR of Texanol TM.

Table 13 shows the effect of various levels of addition of coalescent to formulation NS1217-86, which is described in more detail in Tables 11 and 12. Even though this latex has a $T_g$ well above 55° C., the edge cracking that otherwise occurs with it can be entirely eliminated by addition of as little as 2 PHR of coalescent, when the air drying time is only 60 seconds.

Table 14 illustrates the effect of varying the ratio between HEA and MAGME. When the ratio is sufficiently high, as shown for latex JG1264-44 in the rightmost column of the Table, edge cracking can be completely eliminated, without any significantly adverse effect on deposited film properties compared with latex JG1264-50, where these two components are in equimolar ratio. Although applicant does not wish to be bound by any particular theory, it is believed that the hydroxy functionality of HEA operates to retain water somewhat more tenaciously during the dwell period between coating and rinsing and perhaps also during later drying, thus contributing to more even and less defect-prone film formation.

TABLE 9

PROPERTIES OF LATEXES WITH REDOX INITIATED POLYMERIZATION
Polymer Composition: 48BA/41.7AN/7MAA/2MAGME/1.3HEA

| Latex No. | % Emulsifier Seed | % Emulsifier Feed | % Wet Gum | % Solids | % Conv. | Nicomp Mean d(μ) | Brookfield Visc. @ 60 RPM (cps) | γ (dynes/cm) (Uncorr.) | pH | Tg by DSC (°C.) |
|---|---|---|---|---|---|---|---|---|---|---|
| NS1245-29[b,c] | 0.3% Dowfax 2A-1 | — | 0.55 | 42.1 | 98.1 | 0.117 | 15.5 | 57.8 | 3.10 | 64.6 |
| NS1245-45[d] | 0.3% Dowfax 2A-1 | — | 0.20 | 41.7 | 97.4 | 0.106 | 19.4 | 60.7 | 3.45 | 65.0 |
| NS1245-34[d] | 0.5% Dowfax 2A-1 | 0.5% Dowfax 2A-1 | nil | 41.7 | 97.4 | 0.083 | 22.2 | 50.4 | 3.40 | 64.7 |
| NS1245-43[d] | 0.3% Alipal CO-436 | — | 0.20 | 40.9 | 98.3 | 0.097 | 15.0 | 56.7 | 3.45 | 65.0 |
| NS1245-37[c] | 0.5% Alipal CO-436 | 0.5% Alipal CO-436 | nil | 41.5 | 96.1 | 0.075 | 37.9 | 49.9 | 3.55 | 67.0 |

[a]Redox Initiator: 0.3% APS/0.3% SMB/Trace Fe++, unless indicated otherwise. Polymerization Temperature: 60° C.
[b]No Fe++ in redox system.
[c]No chaser added.
[d]t-BHP/isoascorbic acid chaser employed.

TABLE 10

PROPERTIES OF AUTODEPOSITED COATINGS WITH LATEXES SHOWN IN TABLE 9
Polymer Composition: 48BA/41.7AN/7MAA/2MAGME/1.3HEA

| Latex No. | Rinse Off | Wet Adhesion 3' | Wet Adhesion Scribe | Edge Cracking | Pencil Hardness | Reverse Impact @ 160 in-lbs | Brake Fluid Resistance Pencil Hardness after Soak for: ½ hr | 1 hr | 2 hr | 4 hr | 16 hr | Salt Spray (504 hr/ Resistance 0.7 mil) Scribe | Field |
|---|---|---|---|---|---|---|---|---|---|---|---|---|---|
| NS1245-29 | None | P | P | sl. sev. | 4H | 10/10 | 3H | 3H | 3H | 3H | 2B | 8— | 10 |
| NS1245-45 | None | P | P | tr.-sl. | 2H | 10/10 | 2H | F | F | 2B | 2B | 7— | 7+ |
| NS1245-34 | None | P | P | sl.-sev. | 2H | 10/10 | 2H | 2H | H | B | 3B | 7— | 7+ |
| NS1245-43 | None | P | P | tr.-sl. | 2H | 10/10 | 2H | 2H | H | 2B | 2B | 7+ | 10 |
| NS1245-37 | Slight | P | P | mod. | 2H | 10/10 | 2H | 2H | F | B | 2B | 2 | 8 |

[a]No coalescent in formulation.

TABLE 11

EFFECT OF EMULSIFIER TYPE ON LATEX PROPERTIES FOR A CONSTANT MONOMER COMPOSITION
Composition 50BA/45AN/5MAA

| Latex No. | % Emulsifier[a] | %[b] Wet Gum | % Solids | % Conv. | Nicomp Mean d(μ) | Brookfield Visc. @ 60 RPM (cps) | γ (dynes/cm) (Uncorr.) | Tg by DSC (°C.) |
|---|---|---|---|---|---|---|---|---|
| NS1217-59[c] | 0.47% Dowfax 2A-1 | 0.08 | 41.6 | 97.9 | 0.118 | 16.6 | 55.8 | 49.5 |
| NS1217-68 | 0.47% Abex 26-5 | 0.13 | 41.9 | 97.7 | 0.092 | 52.5 | 62.2 | 61.4 |
| NS1217-70 | 0.47% Texapon K-12 | nil | 41.9 | 97.7 | 0.073 | 85.5 | 59.8 | 62.1 |
| NS1245-02 | 0.20% Texapon K-12 | 0.08 | 41.9 | 98.1 | 0.112 | 30.0 | 61.1 | 57.3 |
| NS1217-84 | 0.47% Alipal CO-436 | 0.03 | 42.1 | 98.1 | 0.087 | 46.1 | 54.4 | 59.6 |
| NS1217-92 | 0.30% Alipal CO-436 | 0.08 | 42.0 | 98.1 | 0.081 | 46.0 | 57.5 | 62.0 |
| NS1217-99 | 0.20% Alipal CO-436 | 0.15 | 42.0 | 98.4 | 0.111 | 35.6 | 59.2 | 65.9 |
| NS1217-86 | 0.47% Alipal CO-433 | 0.03 | 41.9 | 97.7 | 0.084 | 52.0 | 56.6 | 64.7 |
| NS1217-88 | 0.47% Alipal EP-110 | 0.03 | 42.1 | 98.1 | 0.097 | 72.5 | 58.7 | 57.9 |
| NS1217-95 | 0.47% Alipal EP-120 | 0.45 | 42.1 | 98.1 | 0.107 | 48.2 | 65.9 | 64.3 |
| NS1217-90 | 0.47% Disponil AES-13 | 0.04 | 41.9 | 97.7 | 0.106 | 26.4 | 56.5 | 59.4 |

TABLE 11-continued

EFFECT OF EMULSIFIER TYPE ON LATEX PROPERTIES FOR A CONSTANT MONOMER COMPOSITION
Composition 50BA/45AN/5MAA

| Latex No. | % Emulsifier[a] | %[b] Wet Gum | % Solids | % Conv. | Nicomp Mean d($\mu$) | Brookfield Visc. @ 60 RPM (cps) | $\gamma$ (dynes/cm) (Uncorr.) | Tg by DSC (°C.) |
|---|---|---|---|---|---|---|---|---|
| NS1217-97 | 0.30% Aerosol OT | 0.03 | 41.9 | 97.9 | 0.098 | 47.9 | 44.1 | 63.7 |

[a]All included in seed charge.
[b]Based on total batch weight.
[c]Polymer Composition: 55BA/40AN/5MAA, for this latex only.

TABLE 12

PROPERTIES OF AUTODEPOSITED COATING FROM LATEXES SHOWN IN TABLE 11
for the Polymer Composition 50BA/45AN/5MAA

| Latex No. | Rinse Off | Wet Adhesion 3' | Scribe | Edge Cracking | Pencil Hardness | Reverse Impact @ 160 in-lbs | Brake Fluid Resistance Pencil Hardness after Soak for: ½ hr | 1 hr | 2 hr | 4 hr | 16 hr | Salt Spray (504 hr/ Resistance 0.7 mil) Scribe | Field |
|---|---|---|---|---|---|---|---|---|---|---|---|---|---|
| NS1217-59[b] | None | P | P | sl. trace | H | 10/10 | F | F | B | 3B | 3B | 6 | 8 |
| NS1217-68 | None | F(spot) | P | — | 2H | 10/10 | 2H | 2H | 2H | F | HB | 7 | 10 |
| NS1217-70 | None | F(spot) | P | None | 2H | 10/10 | 2H | 2H | 2H | F | HB | 6 | 10 |
| NS1245-02 | None | F(spot) | P | sl.-mod. | 3H | 10/10 | 3H | 3H | 3H | 3H | 2B | 6 | 10 |
| NS1217-84 | None | F(spot) | P | sl. | 3H | 10/10 | 3H | 3H | 3H | F | 2B | 7 | 9 |
| NS1217-92 | None | F(spot) | P | v. sl. | 3H | 10/10 | 3H | 3H | H | H | B | 8 | 10 |
| NS1217-99 | None | F(spot) | P | sl.-mod. | 3H | 10/10 | 3H | 2H | 2H | H | HB | 7 | 9+ |
| NS1217-86 | None | F(spot) | P | sl.-mod. | 3H | 10/10 | 3H | 3H | H | B | 2B | 7 | 8+ |
| NS1217-88 | None | F(spot) | P | sl. | 2H | 10/10 | 2H | 2H | 2H | 2H | B | 7 | 9 |
| NS1217-95 | None | F(spot) | P | sl. | 3H | 10/10 | 3H | 2H | 2H | H | 2B | 8 | 10 |
| NS1217-90 | None | F(spot) | P | trace | 2H | 10/10 | 2H | F | HB | HB | 2B | 6+ | 9+ |
| NS1217-97 | None | F(spot) | P | sl.-mod. | 3H | 10/10 | 3H | 3H | 2H | 3H | 2B | 6 | 9 |

[a]No coalescent employed in the formulation.
[b]Polymer composition: 55BA/40AN/5MAA, for this latex only.

TABLE 13

EFFECT OF COALESCENT LEVEL AND CYCLE AIR DRYING TIME ON EDGE CRACKING
Autophoretic Cycle[a]

| Texanol Level | Coating Time (sec.) | Air Dry (sec.) | Tap Water Rinse[b] (sec.) | Air Dry (sec.) | 1077 RR (sec.) | Cure Time (min.) | Cure Temp (°C.) | Dry Film Thickness (mil) | Edge Cracking |
|---|---|---|---|---|---|---|---|---|---|
| 0 | 45 | 60 | 60 | 60 | 60 | 20 | 160 | 0.73 | trace |
| 2 | 41 | 60 | 60 | 60 | 60 | 20 | 160 | 0.68 | none |
| 4 | 43 | 60 | 60 | 60 | 60 | 20 | 160 | 0.68 | none |
| 0 | 45 | 180 | 60 | 180 | 60 | 20 | 160 | 0.79 | very slight |
| 2 | 41 | 180 | 60 | 180 | 60 | 20 | 160 | 0.68 | very slight |
| 4 | 43 | 180 | 60 | 180 | 60 | 20 | 160 | 0.70 | very slight |
| 0 | 45 | 300 | 60 | 300 | 60 | 20 | 160 | 0.78 | moderate |
| 2 | 41 | 300 | 60 | 300 | 60 | 20 | 160 | 0.72 | moderate |
| 4 | 43 | 300 | 60 | 300 | 60 | 20 | 160 | 0.73 | moderate |

[a]AC-701 type formulation with indicated Texanol level.
Room Conditions: 71° F./35% R.H.
[b]Water Temp. - 58° F.

TABLE 14

EFFECT OF HEA/MAGME RATIO

| | Latex No. | | |
|---|---|---|---|
| | JG1264-50 | JG1264-47 | JG1264-44 |
| | Polymer Comp. | | |
| | 48BA/41.7AN/7MAA/ 2MAGME/1.3HEA | 46.6BA/41.7AN/7MAA/ 2MAGME/2.7HEA | 46BA/41AN/7MAA/ 2MAGME/4HE |
| Latex Properties[a] | | | |
| % Wet Gum | 0.10 | 0.15 | 0.15 |
| % Solids | 42.1 | 42.0 | 41.7 |
| % Conv. | 98.1 | 97.9 | 97.2 |
| Nicomp Mean d($\mu$) | 0.073 | 0.078 | 0.084 |
| Brookfield Visc., 60 RPM (cps) | 61.3 | 54.5 | 50.6 |
| $\gamma$(dynes/cm)(Uncorr.) | 52.1 | 50.8 | 50.2 |
| pH | 4.35 | 4.45 | 4.40 |
| Tg by DSC (°C.) | 62.5 | 65.4 | 66.7 |
| AC Test Results[b] | | | |
| Rinse-Off | None | None | None |
| Wet Adhesion | | | |
| 3' | F(spot) | F(spot) | P |
| Scribe | P | P | P |
| Edge Cracking | None-v. sl. | none-tr. | none |

TABLE 14-continued
EFFECT OF HEA/MAGME RATIO

| | Latex No. | | |
|---|---|---|---|
| | JG1264-50 | JG1264-47 | JG1264-44 |
| | | Polymer Comp. | |
| | 48BA/41.7AN/7MAA/ 2MAGME/1.3HEA | 46.6BA/41.7AN/7MAA/ 2MAGME/2.7HEA | 46BA/41AN/7MAA/ 2MAGME/4HE |
| Pencil Hardness | 4H | 2H(4H)[c] | 4H |
| Reverse Impact @ 160 in-lbs. | 10/10 | 10/10 | 10/10 |
| Brake Fluid Resistance (Pencil Hardness after soak for) | | | |
| ½ hr. | 4H | 2H(4H)[c] | 4H |
| 1 hr. | 4H | 2H(2H)[c] | 4H |
| 2 hr. | 3H | H(H)[c] | 3H |
| 4 hr. | HB | H(H)[c] | HB |
| 16 hr. | 2B | B(B)[c] | B |
| Salt Spray Resistance (0.7 mil; 504 hr.) | | | |
| Scribe | 4 | 6 | 5+ |
| Field | 8+ | 8+ | 8 |

[a] Emulsifier: 0.6% Alipal CO-436 (BOTM); all included in seed charge.
[b] No coalescent employed in the formulation.
[c] Results on retest.

Table 15 shows the effect of some variations of amount of chromium content in the preferred post-treatment composition for coatings deposited in accordance with this invention and in the temperature of final film cure. Generally, 6% post-treatment solution resulted in better salt spray resistance, with little if any corresponding disadvantage, while the two cure temperatures tried produced about the same results.

Table 16 shows that the hydroxyethyl acrylate component can be replaced by acrylamide, with little change in properties of either latex or coated film. On the other hand, other data not shown in detail were collected concerning the possible replacement of butyl acrylate by 2-ethylhexyl acrylate. This substitution produced excessive amounts of wet gum at the latex stage and poor wet adhesion after coating and thus is definitely not preferred.

Tables 17-19 illustrate two other possible variations within the scope of the invention the use of blends and heteroblock polymerization. Table 17 shows the properties of two latexes deliberately synthesized to give one with very high and one with very low $T_g$. Properties of coatings made with blends of these two latexes are shown in Table 18. An attempt was made to determine the glass transition temperature of each of the blends used in Table 18, but the DSC curves failed to exhibit any sharp transition. Increasing amounts of the lower $T_g$ component were positively correlated with reduced brake fluid resistance and film hardness, but all the blends had excellent resistance to edge cracking as shown in the Table.

Table 19 illustrates the results of successive polymerizations of monomer mixes that give the high or low $T_g$ component when used alone, compared with each other and one of the blends from Table 17-18. The results with successive polymerization are much the same as with blends.

TABLE 15
EFFECT OF CURE TEMPERATURE AND CHROMIUM CONCENTRATION IN THE POST-TREATMENT SOLUTION

| JG1264-44: 46BA/41AN/7MAA/2MAGME/4HEA | | | | |
|---|---|---|---|---|
| Cure Temp. (°C.) | 160[b] | 160 | 180 | 180 |
| DY-41 Conc. (%) | 4 | 6 | 4 | 6 |
| Pencil Hardness | 3H | 3H | 3H | 4H |
| Reverse Impact @ 160 in-lbs. | 10/10 | 10/10 | 10/10 | 10/10 |
| Brake Fluid Resistance (Pencil Hardness after soak for) | | | | |
| ½ hr. | 2H | 3H | 4H | 4H |
| 1 hr. | 4H | 4H | 3H | 4H |
| 2 hr. | 2H | 2H | 3H | 4H |
| 4 hr. | H | H | 3H | 3H |
| 16 hr. | F | H | H | 2H |
| Salt Spray Resistance (0.7 mil; 504 hr.) | | | | |
| Scribe | 4+[c] | 6+[c] | 4 | 6 |
| Field | 8+ | 10 | 9 | 9+ |
| JG1264-47: 46.6BA/41.7AN/7MAA/2MAGME/2.7HEA | | | | |
| Cure Temp. (°C.) | 160[b] | 160 | 180 | 180 |
| DY-41 Conc. (%) | 4 | 6 | 4 | 6 |
| Pencil Hardness | 4H | 4H | 3H | 4H |
| Reverse Impact @ 160 in-lbs. | 10/10 | 10/10 | 10/10 | 10/10 |
| Brake Fluid Resistance (Pencil Hardness after soak for) | | | | |
| ½ hr. | 4H | 4H | 3H | 3H |
| 1 hr. | 4H | 4H | 4H | 5H |
| 2 hr. | 4H | 4H | 4H | 4H |
| 4 hr. | 3H | 2H | 2H | 3H |
| 16 hr. | H | H | H | H |
| Salt Spray Resistance (0.7 mil; 504 hr.) | | | | |
| Scribe | 3+ | 6+ | 4 | 6+ |
| Field | 8 | 10 | 9+ | 10- |
| JG1264-50: 48BA/41.7AN/7MAA/2MAGME/1.3HEA | | | | |
| Cure Temp. (°C.) | 160[b] | 160 | 180 | 180 |
| DY-41 Conc. (%) | 4 | 6 | 4 | 6 |
| Pencil Hardness | 3H | 3H | 4H | 4H |
| Reverse Impact @ 160 in-lbs. | 10/10 | 10/10 | 10/10 | 10/10 |
| Brake Fluid Resistance (Pencil Hardness after soak for) | | | | |
| ½ hr. | 3H | 4H | 4H | 4H |
| 1 hr. | 4H | 4H | 3H | 3H |
| 2 hr. | 4H | 4H | 2H | 3H |
| 4 hr. | H | 2H | 2H | 2H |
| 16 hr. | B | H | HB | H |
| Salt Spray Resistance | | | | |

TABLE 15-continued
EFFECT OF CURE TEMPERATURE AND CHROMIUM CONCENTRATION IN THE POST-TREATMENT SOLUTION

| (0.7 mil; 504 hr.) | | | | |
|---|---|---|---|---|
| Scribe | 5+[c] | 7[c] | 4+ | 6+ |
| Field | 9 | 10− | 8 | 9 |

[a]Standard coating conditions at immersion time which gave 0.7 mil dry film. Cure Time = 20 min.
[b]Same conditions as those used for data in Table 7.
[c]Films appeared to be hydroplasticized.

TABLE 16
EFFECT OF REPLACING HYDROXYETHYL ACRYLATE WITH ACRYLAMIDE
Polymer Composition: 48BA/(43-x)AN/7MAA/2MAGME/xAM

| Latex No. | JG1264-72 | JG1264-75 | JG1264-78 |
|---|---|---|---|
| Latex Properties[a] | | | |
| % AM, x | 0.8 | 1.6 | 2.4 |
| % Wet Gum | 0.07 | 0.10 | 0.10 |
| % Solids | 41.9 | 41.0 | 41.8 |
| % Conv. | 97.7 | 95.6 | 97.4 |
| Nicomp Mean d(μ) | 0.075 | 0.076 | 0.080 |
| Brookfield Visc., 60 RPM (cps) | 81.0 | 77.8 | 94.3 |
| γ(dynes/cm)(Uncorr.) | 53.0 | 51.7 | 50.1 |
| pH | 4.35 | 4.45 | 4.55 |
| Tg by DSC (°C.) | 62.5 | 66.5 | 61.5 |
| AC Test Results[b] | | | |
| Rinse-Off | None | None | None |
| Wet Adhesion | | | |
| 3' | F(spot) | F(spot) | F(spot) |
| Scribe | P | P | P |
| Edge Cracking | none-v. sl. | none-v. sl. | none-v. sl. |
| Pencil Hardness | 3H | 2H | 3H |
| Reverse Impact @ 160 in-lbs. | 10/10 | 10/10 | 10/10 |
| Brake Fluid Resistance (Pencil Hardness after soak for) | | | |
| ½ hr. | 3H | 2H | 3H |
| 1 hr. | 2H | 2H | 3H |
| 2 hr. | 2H | 2H | 2H |
| 4 hr. | HB | H | H |
| 16 hr. | B | HB | HB |
| Salt Spray Resistance (0.7 mil; 504 hr.) | | | |
| Scribe | 7− | 6+ | 6 |
| Field | 8+ | 7+ | 6 |

[a]Emulsifier: 0.6% Alipal CO-436 (BOTM; all in seed charge.
[b]No coalescent employed in the formulation.

TABLE 17
PROPERTIES OF LATEXES PREPARED FOR STUDY OF BLENDS
Polymer Comp: xBA/yAN/7 MAA/2 MAGME/1.3 HEA
Emuls.: 0.6% Alipal CO-436
Init.: 0.38% APS

| Latex No. | JG1264-97 | JG1274-04 |
|---|---|---|
| % BA/% AN, x/y | 40/49.7 | 60/29.7 |
| % Wet Gum | 1.1 | 0.08 |
| % Solids | 42.1 | 42.0 |
| % Conv. | 98.1 | 97.9 |
| Nicomp Mean d (μ) | 0.081 | 0.076 |
| Brookfield Visc., 60 RPM (cps) | 36.9 | 63.2 |
| γ (dynes/cm) (Uncorr.) | 49.0 | 57.2 |
| pH | 4.50 | 4.00 |
| Tg by DSC (°C.) | 76.0 | 47.2 |

TABLE 18
PROPERTIES OF COATINGS FROM BLENDED LATEXES

| Blend No. | JG1274-11 | JG1274-10 | JG1274-12 |
|---|---|---|---|
| Wt. % JG1264-97[b] | 75 | 50 | 25 |
| Wt. % JG1274-04[b] | 25 | 50 | 75 |
| Rinse-Off | None | None | None |
| Wet Adhesion | | | |
| 3' | F (spot) | P | P |
| Scribe | P | P | P |
| Edge Cracking | None | None | None |
| Pencil Hardness | 3H | 2H | H |
| Reverse Impact @ 160 in-lbs. | 10/10 | 10/10 | 10/10 |
| Brake Fluid Resistance (Pencil Hardness after soak for) | | | |
| ½ hr. | 3H | H | HB |
| 1 hr. | 2H | F | 2B |
| 2 hr. | 2H | B | 3B |
| 4 hr. | F | 3B | 3B+ |
| 16 hr. | HB | 2B | 3B |
| Salt Spray Resistance (0.7 mil; 504 hr.) | | | |
| Scribe | 5 | 6 | 5 |
| Field | 8 | 8 | 8 |

[a]No coalescent employed in the formulation.

TABLE 19
COMPARISON OF TWO-STAGE POLYMERIZED LATEXES WITH CORRESPONDING SINGLE-STAGE POLYMERIZED LATEX AND A BLEND
Polymer Comp.: xBA/yAN/3.5 MAA/1 MAGME/0.65 HEA//x'BA/y'AN/3.5 MAA/1 MAGME/0.65 HEA

| Latex No. | JG1274-07 | JG1274-13 | JG1274-16 | JG1274-10 |
|---|---|---|---|---|
| Latex Properties[a] | | | | |
| % BA/% AN | | | | |
| Stg. I x/y | 20/24.9 | 30/14.8 | 50/39.7[c] | 50/50 |
| Stg. II x'/y' | 30/14.8 | 20/24.9 | 50/39.7[c] | Blend |
| % Wet Gum | 0.11 | 0.12 | 0.08 | — |
| % Solids | 41.9 | 41.9 | 42.0 | 42.1 |
| % Conv. | 97.7 | 97.7 | 97.9 | — |
| Nicomp Mean d (μ) | 0.085 | 0.088 | 0.081 | — |
| Brookfield Visc., 60 RPM (cps) | 36.8 | 33.6 | 57.0 | — |
| γ (dynes/cm) (Uncorr.) | 53.0 | 51.8 | 53.5 | — |
| pH | 4.40 | 4.55 | 4.45 | — |
| Tg by DSC (°C.) | v. broad | v. broad | 62.5 | v. broad |
| AC Test Results[b] | | | | |
| Rinse-Off | None | None | None | None |
| Wet Adhesion | | | | |
| 3' | P | P | F (spot) | P |
| Scribe | P | P | P | P |

TABLE 19-continued

COMPARISON OF TWO-STAGE POLYMERIZED LATEXES WITH CORRESPONDING SINGLE-STAGE POLYMERIZED LATEX AND A BLEND
Polymer Comp.: xBA/yAN/3.5 MAA/1 MAGME/0.65 HEA//x'BA/
y'AN/3.5 MAA/1 MAGME/0.65 HEA

| Latex No. | JG1274-07 | JG1274-13 | JG1274-16 | JG1274-10 |
|---|---|---|---|---|
| Edge Cracking | None | None | None | None |
| Pencil Hardness | 2H | 2H | 2H | 2H |
| Reverse Impact @ 160 in-lbs. | 10/10 | 10/10 | 10/10 | 10/10 |
| Brake Fluid Resistance (Pencil Hardness after soak for) | | | | |
| ½ hr. | H | H | 2H | H |
| 1 hr. | HB | HB | 2H | F |
| 2 hr. | B | B | HB | B |
| 4 hr. | 3B | 2B | B | 3B |
| 16 hr. | 3B | 2B | B | 3B |
| Salt Spray Resistance (0.7 mil; 504 hr.) | | | | |
| Scribe | 5+ | 3+ | 5 | 6 |
| Field | 8 | 0 | 9+ | 8 |

[a]Emulsifier: 0.6% Alipal CO-436 (BOTM); all in seed charge.
[b]No coalescent employed in formulation.
[c]Homogeneous composition: 50 BA/39.7 AN/7 MAA/2 MAGME/1.3 HEA Table 20 illustrates the effect of partial substitution of acrylonitrile by methacrylic acid. There is less edge cracking at the highest level of methacrylic acid shown, but better salt spray resistance at the middle level.

Tables 21 and 22 illustrate the effect of including styrene in the monomer mix, with and without the cross-linking monomers HEA and MAGME respectively. Salt spray resistance is considerably improved by the inclusion of styrene in either case, but only with the cross-linking monomers included is the brake fluid resistance adequate for most purposes, and the edge cracking (without any coalescent added) is reduced. Edge cracking can be eliminated completely by adding 8 PHR of Texanol ™ before autodepositing the coatings.

Tables 23-25 illustrate both the effect of "chasing" as described above to reduce the residual monomer content in latexes within the composition range of this invention and the importance of adequate humidity during the dwell stage in a complete autodeposition process according to this invention. The very poor salt spray resistance results shown in Table 24 were due to the low humidity during dwell when these samples were coated, as is shown by the comparisons in Table 25.

Tables 26 and 27 illustrate combined chasing and vacuum stripping, or in one case post heating of the latex without vacuum stripping, and also illustrate the effect of lowering the amount of emulsifier at two different initiator levels. The combination of higher initiator and higher emulsifier results in lower residual monomer content under the same physical conditions, but the higher initiator level slightly reduces salt spray resistance. The slight edge cracking shown can be eliminated by use of 7 PHR of Texanol ™.

TABLE 20

EFFECT OF SUBSTITUTING METHACRYLIC ACID FOR ACRYLONITRILE
Polymer Composition: 48 BA/(48.7-x) AN/xMAA/2 MAGME/1.3 HEA

| Latex No. | JG1274-29 | JG1274-37 | JG1274-41 |
|---|---|---|---|
| Latex Properties[a] | | | |
| % MAA, x | 7 | 10 | 13 |
| % Wet Gum | 0.13 | 0.11 | 0.09 |
| % Solids | 42.3 | 41.9 | 41.9 |
| % Conv. | 98.8 | 97.9 | 97.9 |
| Nicomp Mean d (μ) | 0.107 | 0.101 | 0.101 |
| Brookfield Visc., 60 RPM (cps) | 34.6 | 27.6 | 32.8 |
| γ (dynes/cm) (Uncorr.) | 58.1 | 56.5 | 56.2 |
| pH | 4.65 | 4.55 | 4.50 |
| Tg by DSC (°C.) | 63.9 | 67.4 | 69.8 |
| AC Test Results[b] | | | |
| Rinse-Off | None | None | None |
| Wet Adhesion | | | |
| 3' | P | P | P |
| Scribe | P | P | P |
| Edge Cracking | None-tr. | None-tr. | none |
| Pencil Hardness | 3H | 2H | 3H |
| Reverse Impact @ 160 in-lbs. | 10/10 | 10/10 | 10/10 |
| Brake Fluid Resistance (Pencil Hardness after soak for) | | | |
| ½ hr. | 2H | 2H | 2H |
| 1 hr. | 2H | 2H | 2H |
| 2 hr. | HB | 2B | 3B |
| 4 hr. | 3B | 3B | 3B+ |
| 16 hr. | B | 2B | 3B |
| Salt Spray Resistance (0.7 mil; 504 hr.) | | | |
| Scribe | 6+ | 7— | 6 |
| Field | 7+ | 9 | 7+ |

[a]Emulsifier: 0.3% Dowfax 2A-1; all in seed charge.
[b]No coalescent employed in the formulation.

TABLE 21

EFFECT OF INCLUDING STYRENE WITHOUT CROSS-LINKING MONOMERS

| Latex No. | NS1280-06 | NS1280-08 |
|---|---|---|
| Latex Properties[a] | | |
| Polymer Comp. | 47.5 BA/35.5 AN/10 S/7 MAA | 45.5 BA/27.5 AN/20 S/7 MAA |
| % Wet Gum | <0.02 | <0.05 |
| % Solids | 41.8 | 41.8 |
| % Conv. | 97.7 | 98.7 |
| Nicomp Mean d (μ) | 0.094 | 0.091 |
| Brookfield Visc., 60 RPM (cps) | 40.0 | 45.1 |

TABLE 21-continued

EFFECT OF INCLUDING STYRENE WITHOUT CROSS-LINKING MONOMERS

| Latex No. | NS1280-06 | NS1280-08 |
|---|---|---|
| γ (dynes/cm) (Uncorr.) | 62.8 | 64.9 |
| pH | 4.80 | 4.65 |
| Tg by DSC (°C.) | 64.0 | 58.7 |
| AC Test Results[b] | | |
| Rinse-Off | None | None |
| Wet Adhesion | | |
| 3' | P | P |
| Scribe | P | P |
| Edge Cracking | v. sl.–mod. | v. sl.–mod. |
| Pencil Hardness | 2H | H |
| Reverse Impact @ 160 ins-lbs. | 10/10 | 10/10 |
| Brake Fluid Resistance (Pencil Hardness after soak for) | | |
| ½ hr. | H | H |
| 1 hr. | B | 3B |
| 2 hr. | 3B | 3B+ |
| 4 hr. | 3B | 3B+ |
| 16 hr. | 2B | 3B+ |
| Salt Spray Resistance (0.7 mil; 504 hr.) | | |
| Scribe | 8 | 7 |
| Field | 9 | 10 |

[a]Emulsifier: 0.3% Dowfax 2A-1; all in seed charge.
[b]No coalescent employed in the formulation.

TABLE 22

EFFECT OF INCLUDING STYRENE WITH CROSS-LINKING MONOMERS

| Latex No. | NS1280-02 | NS1280-04 |
|---|---|---|
| Latex Properties[a] | | |
| Polymer Comp. | 46 BA/33.7 AN/ 10 S/7 MAA/ 2 MAGME/ 1.3 HEA | 44 BA/25.7 AN/ 20 S/7 MAA 2 MAGME/ 1.3 HEA |
| % Wet Gum | 0.05 | 0.05 |
| % Solids | 41.6 | 41.9 |
| % Conv. | 97.2 | 97.9 |
| Nicomp Mean d (μ) | 0.099 | 0.102 |
| Brookfield Visc., 60 RPM (cps) | 33.0 | 36.1 |
| γ (dynes/cm) (Uncorr.) | 62.1 | 61.9 |
| pH | 4.35 | 4.15 |
| Tg by DSC (°C.) | 58.0 | 64.1 |
| AC Test Results[b] | | |
| Rinse-Off | None | None |
| Wet Adhesion | | |
| 3' | P | P |
| Scribe | P | P |
| Edge Cracking | tr.–v. sl. | v. sl.–mod. |
| Pencil hardness | 2H | 2H |
| Reverse Impact @ 160 in-lbs. | 10/10 | 10/10 |
| Brake Fluid Resistance (Pencil Hardness after soak for) | | |
| ½ hr. | 2H | 2H |
| 1 hr. | 2H | H |
| 2 hr. | HB | B |
| 4 hr. | 3B | 3B+ |
| 16 hr. | 3B | 3B |
| Salt Spray Resistance (0.7 mil; 504 hr.) | | |
| Scribe | 8– | 9 |
| Field | 9+ | 9 |

[a]Emulsifier: 0.3% Dowfax 2A-1; all in seed charge.
[b]No coalescent employed in the formulation.

TABLE 23

USE OF CHASERS WITH BOTH THERMAL AND REDOX INITIATION

| Latex No. | NS1280-35[b] | NS1280-38[c] |
|---|---|---|
| Latex Properties[a] | | |
| Initiator | 0.4% APS | 0.3% APS/0.15% SMB/ 0.00054% FeSO$_4$.7H$_2$O |
| Chaser | 0.2% APS | 0.15% APS/0.075% SMB |
| % Wet Gum | <0.05 | <0.05 |
| % Solids | 42.0 | 42.0 |
| % Conv. | 98.6 | 98.6 |
| Nicomp Mean d (μ) | 0.110 | 0.082 |
| Brookfield Visc., 60 RPM (cps) | 16.0 | 19.4 |
| γ (dynes/cm) (Uncorr.) | 49.8 | 52.2 |
| pH | 3.65 | 2.95 |
| Tg by DSC (°C.) | 68.9 | 67.1 |
| Residual Monomer (ppm) | | |
| AN | 1090 | 830 |
| BA | 1140 | 1270 |
| AC Test Results[d] | | |
| Rinse-Off | None | None |
| Wet Adhesion | | |
| 3' | P | P |
| Scribe | P | P |
| Edge Cracking | mod.–sev. | sl.–mod. |
| Pencil Hardness | 3H | 3H |
| Reverse Impact @ 160 in-lbs. | 10/10 | 10/10 |
| Brake Fluid Resistance (Pencil Hardness after soak for) | | |
| ½ hr. | 3H | 3H |
| 1 hr. | 2H | 3H |
| 2 hr. | H | B |
| 4 hr. | 2B | 3B |
| 16 hr. | 3B+ | 3B |
| Salt Spray Resistance (0.7 mil; 504 hr.) | | |
| Scribe | 6+ | 7+ |
| Field | 9+ | 10 |

[a]Emulsifier: 1.0% Dowfax 2A-1 (0.3% in seed/0.7% in feed)
[b]80° C. Thermal, batch seed/gradual feed process. Chaser added over 1 hr. period while temp. was increased to 85° C. Held at 85° C. for an additional 1.5 hr.
[c]60° C. Redox, batch seed/gradual feed process. Chaser added at 60° C. over 1 hr. period. After chaser added, heated to 65° C. and held for 1.5 hr.
[d]No coalescent employed in formulation. Laboratory conditions when panels coated were 72° F., 52–66% R.H.

TABLE 24

USE OF CHASERS WITH LOW HUMIDITY DURING DWELL TIME AFTER COATING

Polymer Composition
46 BA/31 AN/10 S/7 MAA/2 MAGME/4 HEA

| Latex No. | NS1280-54 | NS1280-57 | NS1280-64[c] |
|---|---|---|---|
| Latex Properties[a] | | | |
| Emulsifier (% BOTM)[b] | 1.0% Dowfax 2A-1 | 1.0% Alipal CO 436 | 1.0% Dowfax 2A-1 |
| % Wet Gum | 0.05 | 0.10 | 0.10 |
| % Solids | 42.1 | 42.0 | 42.8 |
| % Conv. | 98.8 | 98.6 | 99.1 |
| Nicomp Mean d (μ) | 0.112 | 0.115 | 0.117 |
| Brookfield Visc., 60 RPM (cps) | 15.2 | 15.4 | 16.0 |
| γ (dynes/cm) (Uncorr.) | 49.0 | 47.7 | 48.3 |
| pH | 3.65 | 3.60 | 3.65 |
| Tg by DSC (°C.) | 62.1 | 57.4 | 59.8 |
| Residual Monomer (ppm) | | | |
| AN | 730 | 390 | 160 |
| BA | 990 | 660 | 600 |
| AC Test Results[c] | | | |
| Rinse-Off | None | None | None |
| Wet Adhesion | | | |
| 3' | P | P | P |
| Scribe | P | P | P |
| Edge Cracking | sl.–mod. | mod. | sl.–sev. |

TABLE 24-continued
USE OF CHASERS WITH LOW HUMIDITY DURING DWELL TIME AFTER COATING
Polymer Composition
46 BA/31 AN/10 S/7 MAA/2 MAGME/4 HEA

| Latex No. | NS1280-54 | NS1280-57 | NS1280-64[c] |
|---|---|---|---|
| Pencil Hardness | 2H | 2H | 2H |
| Reverse Impact @ 160 in-lbs. | 10/10 | 10/10 | 10/10 |
| Brake Fluid Resistance (Pencil Hardness after soak for) | | | |
| ½ hr. | 2H | 2H | 3H |
| 1 hr. | F | 2H | 2H |
| 2 hr. | 3B+ | 3B+ | 3B+ |
| 4 hr. | 3B+ | 3B++ | 3B+ |
| 16 hr. | 3B+ | 3B++ | 3B++ |
| Salt Spray Resistance (0.7 mil; 504 hr.) | | | |
| Scribe | 0 | 0 | 0 |
| Field | — | — | — |

[a] All prepared by 80° C. thermal, batch seed/gradual feed (2.5 hr.) process with 0.4% APS as initiator. Chaser (0.2% APS) was added over a 1 hr. period at 80° C. Batch was held at 85° C. for an additional 2 hr.
[b] 0.5% in seed, 0.5% in feed.
[c] A portion of aqueous phase (≈2.5%) was removed by atmospheric stripping during the 85° C. hold period.
[d] No coalescent employed in formulation. Laboratory conditions when panels were coated were 71–74° F., 25–33% R.H.

TABLE 25
COMPARISON OF HIGH AND LOW HUMIDITY DURING DWELL TIME AFTER COATING

| | Cure Time/min. | Edge Cracking | Brake Fluid Resistance (Pencil Hardness after soak for) | | | | | Salt Spray Resistance (0.7 mil; 504 hr.) | |
|---|---|---|---|---|---|---|---|---|---|
| | | | ½ hr. | 1 hr. | 2 hr. | 4 hr. | 16 hr. | Scribe | Field |
| NS1280-54 | | | | | | | | | |
| Original Result | 20 | sl.-mod. | 2H | F | 3B+ | 3B+ | 3B+ | 0 | — |
| Retest | 20 | sl. | 3H | 3H | B | 3B | 3B | 5 | 6+ |
| Retest | 40 | sl. | 3H | 2H | B | 3B | 3B | 4+ | 8 |
| NS1280-57 | | | | | | | | | |
| Original Result | 20 | mod. | 2H | 2H | 3B+ | 3B++ | 3B++ | 0 | — |
| Retest | 20 | sl. | 3H | 2H | 3B | 3B | 3B | 6— | 7+ |
| Retest | 40 | sl. | 3H | 2H | B | 3B | 3B | 6— | 8+ |
| NS1280-64 | | | | | | | | | |
| Original Result | 20 | mod.-sev. | 3H | 2H | 3B+ | 3B+ | 3B++ | 0 | — |
| Retest | 20 | sl. | 3H | H | 3B | 3B+ | 3B+ | 6— | 6+ |
| Retest | 40 | sl. | 2H | H | 2B | 3B | 3B+ | 4 | 7 |

[a] Dwell carried out in a covered sink with running hot water (60–80% R.H.).
[b] Cure Temp. = 160° C.

TABLE 26
EFFECT OF REDUCED EMULSIFIER AT LOW INITIATOR LEVEL
Polymer Comp.: 42/BA/35 AN/10 S/7 MAA/2 MAGME/4 HEA

| Latex No. | NS1280-73 | NS1280-83 | NS1280-77 | NS1280-80 |
|---|---|---|---|---|
| Latex Properties[a] | | | | |
| Emulsifier (% BOTM) | 0.6% Alipal CO-436[b] | 0.3% Alipal CO-436[c] | 0.6% Dowfax 2A-1[b] | 0.3% Dowfax 2A-1[c] |
| % Wet Gum | <0.05 | 0.40 | 0.10 | 0.15 |
| % Solids | 42.3 | 42.8 | 42.7 | 42.4 |
| % Conv. | 98.6 | 98.4 | 98.2 | 98.9 |
| Nicomp Mean d (μ) | 0.096 | 0.105 | 0.105 | 0.107 |
| Brookfield Visc., 60 RPM (cps) | 22.0 | 25.0 | 24.3 | 28.0 |
| γ (dynes/cm) (Uncorr.) | 52.3 | 56.8 | 53.9 | 59.2 |
| pH | 4.40 | 4.30 | 4.35 | 4.40 |
| Tg by DSC (°C.) | 65.2 | 68.4 | 68.8 | 63.7 |
| Residual Monomer (ppm) | | | | |
| AN | 222 | 291 | 320 | 196 |
| BA | 610 | 839 | 900 | 807 |
| AC Test Results[d] | | | | |
| Rinse-Off | None | None | None | None |
| Wet Adhesion | | | | |
| 3' | F (spot) | F (spot) | P | P |
| Scribe | P | P | P | P |
| Edge Cracking | v. sl.-mod. | tr.-sl. | mod. | mod. |
| Pencil Hardness | 3H | 3H | 3H | 3H |
| Reverse Impact @ 160 in-lbs. | 10/10 | 10/10 | 10/10 | 10/10 |
| Brake Fluid Resistance (Pencil Hardness after soak for) | | | | |
| ½ hr. | 2H | 3H | 3H | 3H |
| 1 hr. | 2H | 3H | 2H | 3H |
| 2 hr. | 2H | 2H | 2H | 3H |
| 4 hr. | B | 2B | 3B | 3B |
| 16 hr. | 3B | 3B | 3B | 3B |
| Salt Spray Resistance | | | | |

TABLE 26-continued

EFFECT OF REDUCED EMULSIFIER AT LOW INITIATOR LEVEL
Polymer Comp.: 42/BA/35 AN/10 S/7 MAA/2 MAGME/4 HEA

| Latex No. | NS1280-73 | NS1280-83 | NS1280-77 | NS1280-80 |
|---|---|---|---|---|
| (0.7 mil; 504 hr.) | | | | |
| Scribe | 5+ | 7− | 6 | 5+ |
| Field | 9 | 10 | 10 | 8+ |

[a] All prepared by 80° C. thermal, batch seed/gradual feed (2.5 hr.) process with 0.3% APS as initiator. Chaser (0.1% APS) was added over a 1 hr. period at 80° C. The batch was heated to 85° C. and held at 85° C. for 2 hr. while a portion of the aqueous phase ($\approx$4-6%) was removed by stripping at atmospheric pressure.
[b] 0.5% in seed; 0.5% in feed.
[c] All in seed.
[d] No coalescent employed in formulation. Dwell carried out in a covered sink with running hot water (60-90% R.H.).

TABLE 27

EFFECT OF REDUCED EMULSIFIER AT HIGH INITIATOR LEVEL
Polymer Comp.: 42 BA/35 AN/10 S/7 MAA/2 MAGME/4 HEA

| Latex No. | NS1280-95 | NS1280-92 | NS1280-98 | NS1280-86 |
|---|---|---|---|---|
| Latex Properties[a] | | | | |
| Emulsifier (% BOTM) | 0.6% Alipal CO-436[b] | 0.3% Alipal CO-436[c] | 0.6% Dowfax 2A-1[b] | 0.3% Dowfax 2A-1[c] |
| % Wet Gum | 0.05 | 0.5 | 0.05 | 2+ |
| % Solids | 43.4 | 43.4 | 43.7 | 41.6 |
| % Conv. | 99.1 | 99.1 | 98.9 | 97.9 |
| Nicomp Mean d ($\mu$) | 0.108 | 0.140 | 0.135 | 0.111 |
| Brookfield Visc., 60 RPM (cps) | 15.3 | 16.0 | 16.4 | 14.7 |
| $\gamma$ (dynes/cm) (Uncorr.) | 48.9 | 54.1 | 52.8 | 60.7 |
| pH | 3.85 | 3.95 | 3.90 | 4.00 |
| Tg by DSC (°C.) | 67.1 | 65.0 | 66.7 | 66.0 |
| Residual Monomer (ppm) | | | | |
| AN | 100 | 130 | 120 | 568 |
| BA | 420 | 490 | 530 | 824 |
| AC Test Results[d] | | | | |
| Rinse-Off | None | None | None | None |
| Wet Adhesion | | | | |
| 3' | P | P | P | P |
| Scribe | P | P | P | P |
| Edge Cracking | sl.-mod. | mod. | mod. | mod. |
| Pencil Hardness | 2H | 2H | 2H | 2H |
| Reverse Impact @ 160 in-lbs. | 10/10 | 10/10 | 10/10 | 10/10 |
| Brake Fluid Resistance (Pencil Hardness after soak for) | | | | |
| ½ hr. | 2H | 2H | 3H | 2H |
| 1 hr. | 2H | 2H | 3H | 2H |
| 2 hr. | H | 2H | 2H | 2H |
| 4 hr. | 3B+ | 3B | B | H |
| 16 hr. | 3B+ | 3B | 3B | 3B |
| Salt Spray Resistance (0.7 mil; 504 hr.) | | | | |
| Scribe | 4 | 2 | 4−. | 4+ |
| Field | 6+ | 5 | 8 | 7+ |

[a] All prepared by 80° C. thermal, batch seed/gradual feed (2.5 hr.) process with 0.4% APS as initiator. Chaser (0.2% APS) was added over a 1 hr. period at 80° C. Except for NS1280-86, the batch was heated to 85° C. for 2 hr. while a portion of the aqueous phase ($\approx$5-6%) was removed by stripping at atm. pressure. For NS1280-86, the batch temp. was maintained at 80° C. for 4 hr. without stripping.
[b] 0.4% in seed; 0.2% in feed.
[c] All in seed.
[d] No coalescent employed in formulation. Dwell carried out in a covered sink with running hot water (60-90% R.H.).

Use of the most preferred chaser combination, t-butyl hydroperoxide+erythorbic acid+Fe$^{+2}$ ions, is illustrated in Table 28. As may be seen from the Table, excellent reduction of both residual acrylonitrile and butyl acrylate was achieved.

Table 29 shows that dwell times varying over a factor of four (at >50% relative humidity) had relatively little effect on the results.

Tables 30-32 compare the coating results from several coatings according to this invention with those from a commercial, polyacrylic latex-containing autodeposition bath (Autophoretic ™ Coating 701, available from Parker+Amchem Div., Henkel Corp., Madison Heights, Mich.) in three well known measures of corrosion and/or shock damage resistance: the gravelometer/scab corrosion test, the gravelometer/salt spray test, and the scab corrosion test. In some cases, there are also comparison results against a conventional commercial cathodically electrodeposited paint (Uniprime ™ from PPG Corporation, Pittsburgh, Pa.). Most or all of the coatings according to this invention were better than those from the commercial product(s) in the first of these tests and about equal to the commercial product(s) in the other two tests.

TABLE 28

EFFECT OF MOST PREFERRED CHASER COMPOSITION
Polymer Comp.: (A.) 42 BA/35 AN/10 S/7 MAA/2 MAGME/4 HEA
(B.) 44 BA/35.7 AN/10 S/7 MAA/2 MAGME/1.3 HEA

| Latex No. | NS1292-09 | NS1292-17 | NS1292-13 | POL1285-77 |
|---|---|---|---|---|
| Latex Properties[a] | | | | |
| Polymer Comp. | A[b] | A[c] | B[b] | B[c] |
| Emulsifier (% Dowfax 2A-1) | 0.6 | 0.3 | 0.6 | 0.3 |
| Initiator (% APS) | 0.4 | 0.3 | 0.4 | 0.3 |
| % Wet Gum | 0.10 | 0.5+ | <0.05 | 0.1+ |
| % Solids | 41.8 | 41.6 | 42.0 | 41.8 |
| % Conv. | 98.6 | 98.1 | 99.1 | 98.6 |
| Nicomp Mean d ($\mu$) | 0.104 | 0.103 | 0.093 | 0.108 |
| Brookfield Visc., 60 RPM (cps) | 19.4 | 22.9 | 21.0 | 25.4 |
| $\gamma$ (dynes/cm) (Uncorr.) | 53.7 | 57.5 | 54.7 | 61.8 |
| pH | 3.65 | 4.05 | 3.65 | 4.00 |
| Tg by DSC (°C.) | 64.9 | 67.1 | 66.3 | 66.0 |
| Residual Monomer (ppm) | | | | |
| AN | <25 | <25 | <25 | <25 |
| BA | <25 | <25 | <25 | <25 |
| AC Test Results[d] | | | | |
| Rinse-Off | None | None | None | None |
| Wet Adhesion | | | | |
| 3' | P | P | P | P |
| Scribe | P | P | P | P |
| Edge Cracking | sl. | sl.-mod. | sl.-mod. | sl.-mod. |
| Pencil Hardness | 2H | 2H | 2H | H |
| Reverse Impact @ 160 in-lbs. | 10/10 | 10/10 | 10/10 | 10/10 |
| Brake Fluid Resistance (Pencil Hardness after soak for) | | | | |
| ½ hr. | 2H | 2H | 2H | 2H |
| 1 hr. | 2H | 2H | 2H | 2H |
| 2 hr. | H | H | H | 2H |
| 4 hr. | 2B | 3B | 3B | 2B |
| 16 hr. | 3B | 3B | 3B | 3B |
| Salt Spray Resistance (0.7 mil; 504 hr.) | | | | |
| Scribe | 6+ | 7 | 6+ | 7 |
| Field | 8+ | 9+ | 8+ | 9+ |

[a]All prepared by 80° C. thermal, batch seed/gradual feed (2.5 hr.) process. After addition batch was heated at 85° C. for 1 hr., then cooled to 65° C. At 65° C. a trace of FeSO$_4$.7H$_2$O (0.00054%) was added as a 0.1% aq. soln. While temperature was maintained at 65° C., aq. solutions of tBHP and Erythorbic acid were added during a 1 hr. period.
[b]Emulsifier: 0.4% in seed; 0.2% in feed. Chaser levels: 0.22% tBHP/0.22% Erythorbic Acid.
[c]Emulsifier: All in seed. Chaser levels: 0.15% tBHP/0.15% Erythorbic Acid.
[d]No coalescent employed in formulation. Dwell carried out in a covered sink with running hot water (60-90% R.H.).

TABLE 29

EFFECT OF DWELL TIME VARIATION AFTER AUTODEPOSITION COATING

| Latex No.[c] | Dwell Time (sec.) | Film Thickness (mil) | Pencil Hardness | Brake Fluid Resistance (Pencil Hardness after soak for) | | | | | Salt Spray Resistance (504 hr.; 0.7 mil) | |
|---|---|---|---|---|---|---|---|---|---|---|
| | | | | ½ hr. | 1 hr. | 2 hr. | 4 hr. | 16 hr. | Scribe | Field |
| JG1264-38[d] | 15 | 0.70 | 4H | 4H | 4H | 4H | 2H | H | 7 | 9+ |
| | 30 | 0.72 | 4H | 4H | 4H | 2H | HB | B | 6+ | 9 |
| | 45 | 0.73 | 4H | 4H | 4H | 4H | 2H | HB | 7 | 9+ |
| | 60 | 0.70 | 3H | 3H | 3H | 2H | H | HB | 7 | 8+ |
| JG1264-69[e] | 15 | 0.73 | 4H | 3H | 4H | 3H | 2H | F | 7+ | 9+ |
| | 30 | 0.70 | 4H | 4H | 4H | 3H | H | HB | 6 | 8+ |
| | 45 | 0.73 | 4H | 4H | 4H | 4H | 2H | HB | 8 | 10 |
| | 60 | 0.69 | 4H | 3H | 3H | 3H | 2H | HB | 7− | 8+ |
| JG1274-29[f] | 15 | 0.72 | 4H | 4H | 3H | 3H | 2H | B | 7 | 8+ |
| | 30 | 0.73 | 4H | 4H | 3H | 3H | 2H | B | 7− | 8+ |
| | 45 | 0.72 | 5H | 4H | 3H | 3H | 2H | HB | 7 | 9 |
| | 60 | 0.71 | 4H | 3H | 2H | 2H | HB | B | 7 | 9 |

[a]Coating cyle: Bath immersion to give 0.7 mil dry film; dwell; 60 sec. tap H$_2$O rinse; 60 sec. RR 1077 Reaction Rinse; Cure 20 min. @ 160° C.
[b]No coalescent employed in formulation.
[c]Polymer Comp.: 48 BA/41.7 AN/7 MAA/2 MAGME/1.3 HEA. All prepared by 80° C. thermally initiated process.
[d]Emulsifier: 0.6% Texapon K-12
[e]Emulsifier: 0.6% Alipal CO-436
[f]Emulsifier: 0.3% Dowfax 2A-1

TABLE 30
RESULTS OF GRAVELOMETER/SCAB CORROSION TESTING

| Coating[a] | Cure Time (min)/Temp (°C.) | Film Thickness (mil) | Grav./Scab Cycles | GM9508P Rating |
|---|---|---|---|---|
| NS1280-02 | 20/160 | 0.73 | 8 | GM6, SAE 3B, ASTM 4B |
| NS1280-02 | 20/180 | 0.74 | 8 | GM6, SAE 3B, ASTM 4B |
| NS1280-02 | 20/160 | 1.04 | 8 | GM7, SAE 3A, ASTM 4A |
| NS1280-02 | 20/180 | 1.01 | 8 | GM5, SAE 2B, ASTM 3B |
| NS1280-04 | 20/160 | 0.76 | 8 | GM3, SAE 2C, ASTM 3C |
| NS1280-04 | 20/160 | 1.12 | 8 | GM3, SAE 2C, ASTM 3C |
| JG1264-44 | 20/160 | 0.73 | 8 | GM3, SAE 2C, ASTM 3C |
| JG1264-44 | 20/180 | 0.74 | 8 | GM2, SAE 3D, ASTM 4D |
| JG1264-44 | 20/160 | 1.04 | 8 | GM3, SAE 2C, ASTM 3C |
| JG1264-44 | 20/180 | 1.07 | 8 | GM4, SAE 3C, ASTM 4C |
| JG1264-50 | 20/160 | 0.70 | 8 | GM5, SAE 2B, ASTM 3B |
| JG1264-50 | 20/160 | 1.08 | 8 | GM5, SAE 2B, ASTM 3B |
| AC-701[b] | 20/160 | 0.73 | 8 | GM1, SAE 1D, ASTM 2D |
| AC-701[b] | 20/160 | 1.08 | 8 | GM1, SAE 1D, ASTM 2D |
| CED[c] | — | 1.0 | 10 | GM6, SAE 3B, ASTM 4B |

[a]Latex number given for experimentals; all formulated without any coalescent.
[b]Contains 18 phr Texanol.
[c]PPG Uniprime applied by cationic electrodeposition.

TABLE 31
RESULTS OF GRAVELOMETER/SALT SPRAY CORROSION TESTING

| Coating[a] | Cure Time (min)/Temp (°C.) | Film Thickness (mil) | GM9508P Rating[b] |
|---|---|---|---|
| NS1280-02 | 20/160 | 0.72 | GM5, SAE 2B, ASTM 3B |
| NS1280-02 | 20/180 | 0.70 | GM3, SAE 2C, ASTM 3C |
| NS1280-02 | 20/160 | 1.06 | GM6, SAE 3B, ASTM 4B |
| NS1280-02 | 20/180 | 1.02 | GM4, SAE 3C, ASTM 4C |
| NS1280-04 | 20/160 | 0.74 | GM4, SAE 3C, ASTM 4C |
| NS1280-04 | 10/160 | 1.07 | GM5, SAE 2B, ASTM 3B |
| JG1264-44 | 20/160 | 0.74 | GM4, SAE 3C, ASTM 4C |
| JG1264-44 | 20/180 | 0.75 | GM1, SAE 1D, ASTM 2D |
| JG1264-44 | 20/160 | 1.09 | GM6, SAE 3B, ASTM 4B |
| JG1264-44 | 20/180 | 1.09 | GM3, SAE 2C, ASTM 3C |
| JG1264-50 | 20/160 | 0.72 | GM5, SAE 2B, ASTM 3B |
| JG1264-50 | 20/160 | 1.05 | GM6, SAE 3B, ASTM 4B |
| AC-701[c] | 20/160 | 0.76 | GM4, SAE 3C, ASTM 4C |
| AC-701[c] | 20/160 | 1.05 | GM4, SAE 3C, ASTM 4C |

[a]Latex number given for experimentals; all formulated without any coalescent.
[b]After 336 hr. neutral salt spray.
[c]Contains 18 phr Texanol.

TABLE 32
RESULTS OF SCAB CORROSION TESTING

| Coating[a] | Cure Time (min)/Temp (°C.) | Film[b] Thickness (mil) | 15 Cycle Results[b] Scribe Width Failure (in.) | 15 Cycle Results[b] Field Failure (%) |
|---|---|---|---|---|
| NS1280-02 | 20/160 | 0.71 | 0.16 | 5 |
| NS1280-02 | 20/180 | 0.72 | 0.25 | 5 |
| NS1280-02 | 20/160 | 1.05 | 0.19 | 2 |
| NS1280-02 | 20/180 | 1.02 | 0.11 | 1 |
| NS1280-04 | 20/160 | 0.76 | 0.22 | 0 |
| NS1280-04 | 20/160 | 1.04 | 0.22 | 0 |
| JG1264-44 | 20/160 | 0.73 | 1.13 | 3 |
| JG1264-44 | 20/180 | 0.77 | 0.81 | 18 |
| JG1264-44 | 20/160 | 0.98 | 0.50 | 20 |
| JG1264-44 | 20/180 | 1.06 | 0.81 | 3 |
| JG1264-50 | 20/160 | 0.75 | 0.19 | 1 |
| JG1264-50 | 20/160 | 1.07 | 0.22 | 4 |
| AC-701[c] | 20/160 | 0.73 | 0.22 | 2 |
| AC-701[c] | 20/160 | 1.06 | 0.38 | 6 |
| CED[d] | — | 1.0 | 0.13 | 0 |
| CED[d] | — | 1.0 | 0.09 | 0 |

[a]Latex number given for experimentals; all formulated without any coalescent.
[b]Average of two panels for each condition.
[c]Contains 18 phr Texanol.
[d]PPG Uniprime applied by cationic electrodeposition.

What is claimed is:

1. A process for coating ferriferous or zinciferous or both zinciferous and ferriferous surfaces, said process comprising steps of:
    (1) contacting said surfaces with an aqueous liquid autodeposition composition comprising dispersed polymer solids, an acidic component, and an oxidizer component for a time sufficient to cause formation of an adherent coating on said surfaces;
    (2) withdrawing the surfaces coated in step (A) from contact with the autodeposition and maintaining the surfaces coated in step (A) in contact with a gaseous atmosphere containing water vapor for a selected dwell time;
    (3) rinsing the dwelled coated surfaces from step (2) with substantially pure water for a specified rinse time;
    (4) contacting the coated, dwelled, and rinsed surface from step (3) with a chromium containing post-treatment composition for a specified post-treatment time; and
    (5) curing the post-treated coated surface by exposure to gases at a temperature of at least about 140° C for a specified cure time, so as to produce an adherent dry coating on the surface,
wherein the improvement comprises selecting the dispersed polymer solids so that they consist essentially of one or more copolymers made by polymerizing a homogeneous mixture of monomers by addition polymerization, said homogenous mixture of monomers consisting essentially of:
    (A) from about 40–about 50 of monomers selected from the group having the general formula I:

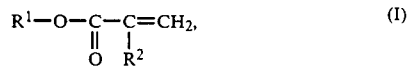

where $R^1$ is a saturated, branched or unbranched, alkyl group having from about 3 to about 8 carbon atoms and $R^2$ is hydrogen or methyl;
    (B) from about 30–about 40 w/o of acrylonitrile;
    (C) from 0–about 20 w/o of monomers selected from the group consisting of styrene, α-methyl styrene, and methyl methacrylate;

(D) from about 5–about 10 w/o of monomers selected from the group consisting of acrylic acid and methacrylic acid;

(E) from 0–about 5 w/o of the methyl ether of methyl acrylamidoglycolate, having chemical formula II

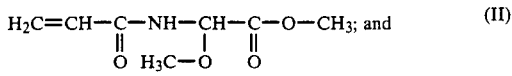 (II)

(F) from 0–about 5 w/o of monomers selected from the group having the general chemical formula III

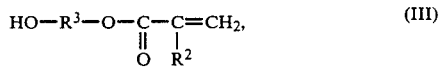 (III)

where $R^2$ has the same meaning as in part (A) and $R^3$ is a saturated, branched or unbranched, divalent hydrocarbon moiety having from 2 to 4 carbon atoms and having its two open valences on distinct carbon atoms.

2. A process according to claim 1, wherein said homogeneous mixture of monomers consists essentially of:
(A) from about 40–about 50 percent by weight of component (A);
(B) from about 30–about 40 w/o of acrylonitrile;
(C) from about 5–about 20 w/o of component (C);
(D) from about 5–about 10 w/o of component (D);
(E) from about 1–about 5 w/o of component (E); and
(F) from about 1–about 5 w/o of component (F).

3. A process according to claim 2, wherein said homogeneous mixture of monomers consists essentially of:
(A) from about 43–about 45 w/o of component (A);
(B) from about 35–about 37 w/o of acrylonitrile;
(C) from about 8–about 12 w/o of component (C);
(D) from about 6–about 8 w/o of component (D);
(E) from about 1.5–about 2.5 w/o of component (E); and
(F) from about 1.5–about 2.5 w/o of component (F).

4. A process according to claim 3, wherein component (A) is butyl acrylate, component (C) is styrene, component (D) is methacrylic acid, and component (F) is hydroxyethyl acrylate.

5. A process according to claim 4, wherein the glass transition temperature of said one or more copolymers is at least about 55° C. and the composition contains an amount of coalescent that is less than 8 w/o of the polymer solids content in the composition.

6. A process according to claim 3, wherein the glass transition temperature of said one or more copolymers is at least about 55° C. and the composition contains an amount of coalescent that is less than 8 w/o of the polymer solids content in the composition.

7. A process according to claim 2, wherein the glass transition temperature of said one or more copolymers is at least about 55° C. and the composition contains an amount of coalescent that is less than 8 w/o of the polymer solids content in the composition.

8. A process according to claim 1, wherein the glass transition temperature of said one or more copolymers is at least about 55° C. and the composition contains an amount of coalescent that is less than 8 w/o of the polymer solids content in the composition.

9. A process according to claim 8, wherein the relative humidity of the gaseous atmosphere contacted during step (2) is at least about 50%.

10. A process according to claim 5, wherein the relative humidity of the gaseous atmosphere contacted during step (2) is at least about 50%.

11. A process according to claim 2, wherein the relative humidity of the gaseous atmosphere contacted during step (2) is at least about 50%.

12. A process according to claim 1, wherein the relative humidity of the gaseous atmosphere contacted during step (2) is at least about 50%.

* * * * *